US006254946B1

(12) United States Patent
Hirata et al.

(10) Patent No.: US 6,254,946 B1
(45) Date of Patent: Jul. 3, 2001

(54) OXYGEN-ABSORBING COMPONENT, OXYGEN ABSORBENT PACKAGE AND OXYGEN-ABSORBING MULTILAYERED BODY CONTAINING SAME

(75) Inventors: Masukazu Hirata, Ibaraki-ken; Kazuhiro Otsu, Chiba-ken; Yoshinori Mabuchi, Aichi-ken; Noriyuki Kimura, Saitama-ken; Takahiro Seki, Tokyo, all of (JP)

(73) Assignee: Mitsubishi Gas Chemical Company, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,786

(22) Filed: Jun. 24, 1998

(30) Foreign Application Priority Data

Jun. 30, 1997 (JP) .................................... 9-174348

(51) Int. Cl.[7] ........................... C09K 15/00; B29C 51/00; B27N 22/00; B29D 22/00
(52) U.S. Cl. ...................... 428/35.2; 428/36.4; 428/35.5; 428/343; 428/327; 428/35.7; 428/220; 264/164; 252/188.28; 252/181.3
(58) Field of Search .................................... 428/34.3, 35.7, 428/220, 327, 332, 402, 35.2, 35.5, 36.4, 343, 35.4, 36.6; 252/188.28, 181.3; 264/291, 292, 210.1, 210.7, 164

(56) References Cited

U.S. PATENT DOCUMENTS 5,126,174   6/1992   Courtright et al. ............... 428/34.3

FOREIGN PATENT DOCUMENTS

| 0 285 694 | 10/1988 | (EP) . |
| 0 713 899 | 5/1996 | (EP) . |
| WO 94/07379 | 4/1994 | (WO) . |

OTHER PUBLICATIONS

Database WPI, Week 9320, Derwent Publications Ltd., London, GB, AN 93–162258 of JP 05 093189 A (4–1993).

Patent Abstracts of Japan, vol. 16, No. 338 (C–0965), Jul. 22, 1992, of JP 04 100537 A (4–1992).

Primary Examiner—Rena L. Dye
Assistant Examiner—Michael C. Miggins
(74) Attorney, Agent, or Firm—Frishauf, Holtz, Goodman, Langer & Chick, P.C.

(57) ABSTRACT

An oxygen-absorbing composition comprising (a) a powdery or particulate crosslinked polymer containing carbon-carbon unsaturated bonds and having a high heat resistance and being easy to grind due to crosslinked structure, and (b) a catalyst. The oxygen-absorbing composition can be used in a dry state and can be utilized in an oxygen absorbent package. An oxygen-absorbing multilayered body can be formed from the oxygen-absorbing composition. A sheet or a film oxygen-absorbing multilayered body can be made from the oxygen-absorbing composition.

35 Claims, 17 Drawing Sheets

OXYGEN-ABSORBING COMPONENT, OXYGEN ABSORBENT PACKAGE AND OXYGEN-ABSORBING MULTILAYERED BODY CONTAINING SAME

BACKGROUND OF THE INVENTION (1) Field of the Invention

The present invention relates to a powdery or a particulate oxygen-absorbing component which is excellent in oxygen-absorbing performance and which can be used in a wide humidity range of a dry state to a highly humid state, an oxygen absorbent package, and an oxygen-absorbing monolayered body and multilayered body, each containing this oxygen-absorbing component.

An oxygen-absorbing component of the present invention can be used directly or as a mixture of the same, an adsorbing component and the like in the form of sachets, the form of a resin which is kneaded with the oxygen-absorbing component, or the form of a package comprising a sheet-like or a film-like oxygen-absorbing monolayered body or multilayered body obtained by molding a resin containing the oxygen-absorbing component for the purpose of preventing the oxidation of various products such as foods, drugs, metallic products and electronic products which are liable to be affected by oxygen and to bring about a quality change.

(2) Description of the Related Art

For the purpose of preventing the oxidation of various products typified by foods, drugs, metallic products and electronic products which easily change the quality under the influence of oxygen, there have heretofore been used oxygen absorbents which can remove oxygen from packaging containers or packaging bags receiving these products. Most of these oxygen absorbents which had been developed in former days and are presently used, are in the form of sachets wherein the powdery or the particulate oxygen-absorbing component is contained in a packaging material (Japanese Patent Publication Nos. 50618/1981, 6846/1987, etc.). In addition, other forms such as a label type, a card type and a packing type have also been used in which a piece of a monolayered or a multilayered sheet containing a layer comprising a resin kneaded with the oxygen-absorbing component is put in a packaging material (Japanese Patent Application Laid-open Nos. 219430/1995, 137759/1995, etc.).

Furthermore, as another safe oxygen-absorbing body which can easily be handled, can be applied in a wide range and can prevent eating by mistake, a form such as a film or a sheet (the film and the sheet will hereinafter be referred to as "the film" together) has been contrived.

In order to form the oxygen-absorbing component into the film while its oxygen-absorbing function is maintained, it is an easy and convenient way to immobilize the oxygen-absorbing component by making a composite of the powdery or the particulate oxygen-absorbing component and a thermoplastic resin as a matrix component. Furthermore, if the monolayered film of this composite is directly used, the film contacts the content, which leads to the contamination of the content. To avoid this inconvenience, a multilayered structure in which both the sides of the oxygen-absorbing layer are covered with resin layers has been contrived. In addition, when either of both the resin layers can be made of a gas-barrier material, both of a gas-barrier function and an oxygen-absorbing function can be kept by the multilayered film alone. These techniques have been disclosed in Japanese Patent Publication Nos. 1824/1987, 2648/1988, etc.

Moreover, in order to increase the oxygen permeability of the oxygen-absorbing layer or the oxygen permeability of a resin layer other than the gas-barrier layer which covers the oxygen-absorbing layer (or both the resin layers in the case of no gas-barrier layer), there have been contrived a technique of making the oxygen-absorbing layer porous, a technique of making the resin layer covering the oxygen-absorbing layer porous, the use of a thin non-porous resin layer, the simultaneous use of a thin non-porous resin layer and a porous resin layer, etc. Here, as a method of making the layer porous, a resin including an iron powder as the oxygen-absorbing component and a filler hardly soluble in water is drawn. Some examples of these techniques have been disclosed in Japanese Patent Application Laid-Open Nos. 72851/1990, 162251/1993, 318675/1993, 234811/1997, etc.

Furthermore, in addition to a further positive implementation of the oxygen-absorbing function, a way of reducing the permeability of oxygen from the outside by substantially improving the gas-barrier properties of a packaging material has also been contrived. Concretely, in this way, there is used a resin layer comprising various resins containing a small amount of a metal catalyst, and the resin layer can be covered with another resin layer. Some examples of these techniques have been disclosed in Japanese PCT Patent Application Laid-Open No. 500846/1990, Japanese Patent Application Laid-Open Nos. 269044/1991, 97163/1993, 115776/1993, 305973/1993, 48474/1994, etc.

As described above, many proposals have been made on the packaging materials in which the resin layer of a monolayered body or the partial resin layers of a multilayered body absorb oxygen as a whole. In this case, however, there is a problem that, with the progress of the oxygen absorption, the whole absorption layer becomes oxidized and degraded, so that the strength of the packaging material inconveniently deteriorates.

As the oxygen-absorbing component, various metals or metallic compounds are presently used, and particularly, an iron powder is most often used. However, in order to cause the oxidation of a metallic powder such as this iron powder, water is necessary, and when a system which is an object of the oxygen-absorbing contains little water (hereinafter referred to as "the dry system"), the oxygen absorption does not occur or an oxygen absorption rate is extremely slow.

In this connection, as oxygen-absorbing components applicable to the dry system as well as a highly humid system, reaction systems including various organic compounds as materials to be oxidized have been developed. Examples of these oxygen-absorbing components include systems which contain carbon-carbon unsaturated bonds, i.e., low molecular systems (Japanese Patent Publication Nos. 28266/1985 and 60936/1987) and high molecular systems (Japanese Patent Application Laid-Open Nos. 29741/1992 and 115776/1993), and systems which scarcely contain the carbon-carbon unsaturated bonds, i.e., low molecular systems such as alcohols (Japanese Patent Application Laid-Open No. 8441/1991), and various high molecular systems such as polyolefins (Japanese Patent Application Laid-Open No. 187238/1992), ethylene-vinyl alcohol copolymers (Japanese Patent Publication No. 49354/1994), polyvinyl chlorides (Japanese Patent Application Laid-Open No. 269044/1991) and polyamides (Japanese PCT Patent Application Laid-Open No. 500846/1990). Every system mentioned above contains a metal or a metallic compound as a catalyst for accelerating the reaction with oxygen.

On the other hand, in the case where the oxygen-absorbing component for the dry system is practically used, this component is preferably a solid which can be easily handled. Furthermore, similarly to a usual solid reaction, the surface area of the solid is preferably increased to accelerate the oxidation reaction. From such a viewpoint, techniques of obtaining the powdery or the particulate solid have been developed, and their examples include a system in which a low molecular compound (a liquid) is supported on a carrier or solidified (Japanese Patent Publication Nos. 60936/1987 and 11056/1996) and a system in which lumps of a polymer (a solid) are ground (Japanese Patent Application Laid-Open No. 187238/1992). However, when the liquid is supported or solidified, there is a risk that a liquid elutes, and when the solid lumps are ground, this grinding is required to be done at a low temperature, because the above-mentioned polymer (a thermoplastic resin) is flexible in the vicinity of room temperature. In addition, there is a problem that, in a part of the polymer systems having a low glass transition temperature and containing the carbon-carbon unsaturated bonds, even after the grinding is once done at a low temperature, the powdery granules or the particles re-adhere to each other to become large lumps, when returned to room temperature.

As described above, the oxygen-absorbing component for the dry system is already known, but an easily handleable powdery or the particulate oxygen-absorbing component in which all constituents are in solid form has never existed so far.

SUMMARY OF THE INVENTION

An object of the present invention is to provide an oxygen-absorbing component which can solve the problems of the above-mentioned conventional techniques and which is excellent in oxygen-absorbing performance and which can be used in a wide humidity range of a dry state to a highly humid state.

Another object of the present invention is to provide an oxygen absorbent package in which the oxygen-absorbing component is used and which does not cause any trouble even when the oxygen absorbent package comes in contact with products therein.

Still another object of the present invention is to provide an oxygen-absorbing monolayered body and multilayered body including an oxygen-absorbing layer which keep their strength even after it has absorbed oxygen.

The present inventors have intensively investigated, and as a result, it has been found that, by introducing a suitable crosslinked structure into an organic compound having carbon-carbon unsaturated bonds, an easily handleable powdery or particulate oxygen-absorbing component comprising a crosslinked molecule can be prepared, and simultaneously an excellent oxygen-absorbing performance can be exerted. In consequence, the present invention has been completed. Furthermore, there have been contrived a novel oxygen absorbent package in which all components including the oxygen-absorbing component are surrounded by a gas permeable packaging material, and an oxygen-absorbing monolayered body or multilayered body including an oxygen-absorbing layer which can keep its strength even after it has absorbed oxygen, whereby the present invention has been completed.

The present invention is concerned with an oxygen-absorbing component which comprises a powdery or a particulate crosslinked polymer having an average particle diameter of 0.01 to 5 mm and carbon-carbon unsaturated bonds, an oxygen absorbent package in which the oxygen-absorbing component is used, and an oxygen-absorbing monolayered body and multilayered body.

That is to say, the first aspect of the present invention is directed to an oxygen-absorbing component which comprises a powdery or a particulate crosslinked polymer having an average particle diameter of 0.01 to 5 mm and carbon-carbon unsaturated bonds, wherein said crosslinked polymer has 0.001 to 0.025 mol of the carbon-carbon unsaturated bonds per gram and 0.0001 to 0.02 mol of crosslinking points per gram; said crosslinked polymer is a polymer obtained by partially crosslinking a polymer of a diene or a copolymer of the diene and another unsaturated compound; and said crosslinked polymer contains at least one of a metal or a metallic compound as a catalyst for an oxidation reaction and an antistatic compound.

The second aspect of the present invention is directed to an oxygen absorbent package in which the oxygen-absorbing component is covered with a gas permeable packaging material in part or in whole, said oxygen absorbent package being a label type oxygen absorbent package in which an adhesive layer of this oxygen absorbent is formed at a part on the outer surface of the packaging material, a card type oxygen absorbent package in which a strong base material is used at a part of the packaging material, or a packing type oxygen absorbent package in which a flexible base material is used at a part of the packaging material.

The third aspect of the present invention is directed to an oxygen-absorbing monolayered body and multilayered body which comprise an oxygen-absorbing layer obtained by molding an oxygen-absorbing resin composition of a thermoplastic resin and the oxygen-absorbing component dispersed in the thermoplastic resin or which comprise a laminate obtained by laminating a non-porous oxygen permeating layer, an continuously porous oxygen permeating layer and a gas barrier layer on this oxygen-absorbing layer.

The fourth aspect of the present invention is directed to a method for preparing the oxygen-absorbing monolayered body and multilayered body.

EXPLANATION OF REFERENCE NUMERALS

Figure 1:
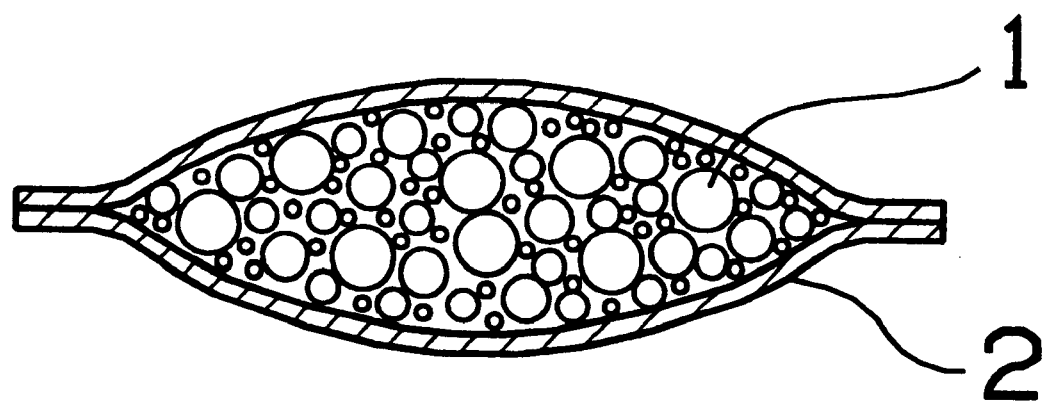
FIG. 1 is a sectional view of a sachet type oxygen absorbent package in which components containing an oxygen-absorbing component are put in a sachet made of a gas permeable packaging material.

1 . . . Various components containing an oxygen-absorbing component
2 . . . Packaging material (a monolayered or a multilayered body) comprising a gas permeable film
3 . . . Small piece (a monolayered or a multilayered body) obtained by kneading components containing the oxygen-absorbing component with a thermoplastic resin and then drawing the mixture to make it porous
4 . . . Adhesive packaging material (a monolayered or a multilayered body) on one surface (here, the underside in the drawing)
5 . . . Rigid base material or flexible base material (a monolayered or a multilayered body)
11 . . . Oxygen-absorbing layer (inclusive of a crosslinked polymer as the oxygen-absorbing component)
12 . . . Porous oxygen-absorbing layer (a continuously porous layer containing the crosslinked polymer as the oxygen-absorbing component)
13 . . . Non-porous layer (a non-porous oxygen-permeating layer)
14 . . . Porous layer (a continuously porous oxygen-permeating layer)
15 . . . Adhesive layer (an adhesive, an adhesive resin or the like)
16 . . . Barrier layer
17 . . . Buffer layer
20 . . . Both-side absorption type oxygen-absorbing film
30 . . . One-side absorption type oxygen-absorbing film
40 . . . Contents (a solid, a liquid, a mixture of the solid and the liquid, or the like)
50 . . . Container body having barrier properties
60 . . . Usual nonoxygen-absorbing functional barrier film or barrier bag.

DETAILED DESCRIPTION OF THE PREFERRED

In the first place, an oxygen-absorbing component of the present invention will be described.

A crosslinked polymer in the present invention means a polymeric compound having carbon-carbon unsaturated bonds and crosslinking points in its molecule.

Crosslinking in the present invention means crosslinking by a covalent bond. In this case, various covalent bonds can be utilized, but in order to impart heat resistance to the crosslinked polymer, a crosslinked structure by a bond such as C—C, C—O or C—N having a high bond energy is suitable. Owing to the introduction of such a crosslinked structure, the molecule becomes giant, and hence it becomes insoluble and infusible, so that it becomes an easily handleable component and its application range expands. Moreover, a carrier and the like are unnecessary, so that an amount of absorbed oxygen per unit weight of the polymer increases.

For the preparation of the crosslinked polymer for use in the present invention, various methods which are known in the field of polymer chemistry can be used. For example, the crosslinked polymer can be obtained by directly polymerizing a single kind of monomer or plural kinds of monomers (which partially include monomers having 3 or more functional groups and which possess 2 or more functional groups on the average on the whole) having a relatively low molecular weight, or it can be obtained by first forming an oligomer or a polymer having a relatively high molecular weight, and then crosslinking the same. Of these methods, the latter method is more suitable, because it can control the generation of polymerization heat and it is suitable for mass production.

As the method of crosslinking the material in the subsequent step, it is possible to use a usual physical or chemical means. Examples of the physical crosslinking method include a method of utilizing a simple high-temperature heating operation and a method of utilizing the irradiation of electromagnetic wave (ultraviolet ray, gamma ray, microwave or the like), corpuscular beam (electron beam or the like), ultrasonic wave or the like, and one example of the chemical crosslinking method is a method of utilizing a reaction in which a radical generator which is known as an initiator or a crosslinking agent is used. Of these methods just mentioned, the method of utilizing a crosslinking reaction in which an organic peroxide is used as the radical generator is suitable.

A typical preparation method of the powdery or the particulate crosslinked polymer by the use of the chemical crosslinking technique will be described as follows.

That is to say, in the first place, for a mixture of an uncrosslinked organic compound (a compound to be crosslinked) and a radical generator, any of the crosslinking in a bulk state, the crosslinking in a solution state and the crosslinking in a suspension state or an emulsion state is carried out. Afterward, in order to obtain a powdery or a particulate solid, grinding is done in the case of the crosslinking in the bulk state; drying and grinding are done in the case of the crosslinking in the solution state; or the separation of liquid phases and drying are done in the case of the crosslinking in the suspension state or the emulsion state. For each unit operation of these procedures, it is possible to use each of techniques and devices which are known in a chemical engineering field.

The crosslinked polymer for use in the present invention is in the state of a powder or particle having an average particle diameter of 0.01 to 5 mm, more preferably 0.03 to 0.5 mm. The smaller the particle diameter is, the higher the danger of a dust explosion is, and the larger the particle diameter is, the lower an oxygen absorbing rate is.

A crosslinking degree in the crosslinked polymer for use in the present invention is required to be such that the powder or the particle can easily be obtained and simultaneously a suitable heat resistance and oxygen absorbing performance can be obtained.

Such a suitable crosslinking degree depends on the molecular structure and the molecular weight of the compound to be crosslinked, but the crosslinked polymer preferably contains 0.0001 to 0.02 mol of crosslinking points per gram of the crosslinked polymer. As a result, for example, in the case that the grinding is done after the crosslinking in the bulk state, the plasticity of the crosslinked polymer is lowered by a moderate crosslinking, so that it becomes brittle, which conveniently makes the grinding easy.

With regard to the change in physical properties by the crosslinking, the crosslinked polymer for use in the present invention preferably has a flexural modulus at 25° C. of 0.1 MPa or more, more preferably 1 MPa, most preferably 10 MPa or more.

The crosslinked polymer for use in the present invention preferably has a bending strength at 25° C. (a breaking strength) of 100 MPa or less, more preferably 10 MPa or less.

Furthermore, the crosslinked polymer for use in the present invention preferably has a linear expansion (an increment in one direction) of 50% or less after it has been immersed in toluene at 25° C. for one day.

With regard to a relation between the heat resistance and the crosslinking degree, in the case that the crosslinked polymer is used as the oxygen absorbent in the state of the powder or the particle without any additional treatment, the crosslinked polymer should be crosslinked so as not to flow or mutually adhere until 100° C. or higher, preferably until 150° C. or higher, and in the case that the crosslinked polymer is kneaded with the resin and then used in a suitable form, the crosslinked polymer should be crosslinked so as not to flow or mutually adhere until 150° C. or higher, preferably until 200° C. or higher. Consequently, in the respective use forms, the oxygen-absorbing component can be kept in the solid state, and similarly in the case of an iron powder, the crosslinked polymer can be used to prepare the oxygen absorbent package and the oxygen-absorbing monolayered body and multilayered body in the form of a monolayered or a multilayered film or sheet containing a layer comprising the resin kneaded with the oxygen-absorbing component.

With regard to a relation between the oxygen absorbing performance and the crosslinking degree, if the organic compound containing carbon-carbon unsaturated bonds is used as the compound to be crosslinked, these bonds (exactly, carbon of these bonds and carbon adjacent thereto) mainly take part in the crosslinking, but since these bonds are also necessary for a reaction with oxygen, it is needful to moderately leave these bonds. Concretely, the organic compound containing a plurality of carbon-carbon unsaturated bonds in one molecule is preferably crosslinked by the use of only a part of these bonds so that 0.001 to 0.025 mol of the carbon-carbon unsaturated bonds per gram may remain after the crosslinking.

With regard to the oxygen-absorbing component of the present invention, as known in the autoxidation of a usual organic compound, any of various kinds of metals or metallic compounds can be added as a catalyst, whereby the oxidation reaction of the oxygen-absorbing component can be more accelerated than in the case of no addition of the catalyst. However, since the reactivity can also be enhanced by reducing the particle diameter of the oxygen-absorbing component, it is possible to obtain a suitable oxidation rate without adding this catalyst, if the particle diameter of the oxygen-absorbing component can sufficiently be reduced. In general, the smaller the particle diameter is, the smaller the amount of the catalyst may be. Furthermore, in the case that some polymers are used as the compounds to be crosslinked, a small amount of the remaining polymerization catalyst alone can effectively function as the oxidation catalyst on occasion.

No particular restriction is put on the metal or the metal in the metallic compound which can be used as the catalyst, but transition metals are particularly suitable, because their electron state is suitable for the catalyst. Of these metals, cobalt which can exert a particularly high catalyst activity is preferable, and iron and manganese which are relatively safe are also preferable.

The catalyst which can be used in the present invention is mixed with the compound to be crosslinked, particularly in the case of the chemical crosslinking, with the compound to be crosslinked and the radical generator before the crosslinking, whereby the catalyst can uniformly be dispersed or dissolved therein and it can uniformly be contained after the crosslinking. Here, the catalyst having a high solubility in the organic compound which is the compound to be crosslinked is preferably used so that the catalyst may further be uniformly dispersed or dissolved in the compound to be crosslinked. Typical examples of such a preferable catalyst include fatty acid salts of the metals. In this case, if the fatty acid moiety contains the carbon-carbon unsaturated bonds, the fatty acid salt can be introduced into the crosslinked polymer.

The catalyst in the oxygen-absorbing component is incorporated in the crosslinked structure, and hence the catalyst is scarcely eluted out of the oxygen-absorbing component. As a result, also in the case that this oxygen-absorbing component, when used, is kneaded with a thermoplastic resin which is a matrix component, the catalyst is scarcely eluted out of the oxygen-absorbing component, and for this reason, the deterioration of the matrix component by oxidation can be minimized.

In the oxygen-absorbing component of the present invention, the oxidation reaction can also be accelerated by the irradiation of light (mainly in an ultraviolet range), as similarly known in the autoxidation. However, since the powder or the particle of the oxygen-absorbing component are small, and the catalyst functions when added, the irradiation of the light is not essential.

In the oxygen-absorbing component of the present invention, in the case that the amount of the catalyst is small, an initial oxygen absorbing rate after the oxygen-absorbing component is allowed to stand in an oxygen atmosphere is low, so that an induction period occurs. This fact is desirable in a sense, because some leeway can be given during the preparation of the oxygen absorbent package and the oxygen-absorbing body according to the present invention. However, in the case that this induction period is too long, for example, a treatment of allowing the oxygen absorbent package and the oxygen-absorbing body to stand in the oxygen atmosphere may previously be carried out for about the induction period of time so that the oxygen absorption may be begun in a short time from the start of the use of the oxygen absorbent package and the oxygen-absorbing body.

As the compound to be crosslinked, a compound containing the carbon-carbon unsaturated bonds can be used. As the compound containing a large amount of the carbon-carbon unsaturated bonds per unit weight, polymers (oligomers, polymers and copolymers) of diene compounds are particularly preferable, and typical examples thereof include polybutadiene and polyisoprene.

In this connection, to the polymer of the diene compound, an antioxidant is often added. Since such an antioxidant prevents the oxygen absorption after the crosslinking has been done to form the oxygen absorbent package and the oxygen-absorbing body, it is desirable that the antioxidant be not contained therein. Nevertheless, a small amount of the antioxidant does not cause complicated problem, and alternatively, the antioxidant can be inactivated during the crosslinking reaction.

In the oxygen-absorbing component according to the present invention, the crosslinked polymer itself is easily charged because of its having a low polarity, and particularly in the case that it is in the state of a fine powder, the adhesion of the fine powder to peripheries is noticeable, whereby its handling is made difficult. Accordingly, in order to prevent this charging, it is desirable to add a compound having a relatively high polarity to the oxygen-absorbing component. Such a compound is usually known as an antistatic agent, and the compound which is recognized to be a food additive is desirable from the viewpoint of safety. Furthermore, in the oxygen-absorbing component according to the present invention, it is desirable that such a compound be added prior to the crosslinking so as to incorporate the same in the crosslinked structure.

The safety of the oxygen-absorbing component according to the present invention, from eating by mistake is extremely high. This fact is because the oxygen-absorbing component is a crosslinked substance, and so the solubility of the oxygen-absorbing component as the whole powder or particle is extremely low, and low-molecular weight compounds produced by the oxidation and the metal as the catalyst are scarcely eluted from the powder or the particles.

In general, in the oxygen absorbent containing an organic compound as the main component, the low-molecular weight compounds which are the causes of a bad odor are produced with the oxidation reaction. However, the crosslinked polymer of the present invention has close inner bonds, so that the production of the low-molecular weight compounds can be inhibited, and the release (volatilization or elusion) of the low-molecular weight compounds from the powder or the particles can also be controlled. Furthermore, the increase in volume during the oxidation reaction can be limited by the crosslinked structure, so that the oxidation reaction does not excessively progress and the production of the low-molecular weight compounds can be controlled.

As a means for further suppressing the odor, there is an improvement of the molecular structure of the compound to be oxidized. This improvement is to establish a structure in which even if a covalent bond is cut by the oxidation reaction, the low-molecular weight compounds are not separated out. Concretely, for example, for the oligomer or the polymer of the diene compound, it is recommended to utilize a compound having less side chains and a low ratio of a 1,2-linkage, or it is recommended to utilize polybutadiene rather than polyisoprene. Moreover, it is also effective to use a copolymer of a diene and an olefin or the like in which carbon-carbon unsaturated bonds are sparsely contained, or a partially hydrogenated additive of the oligomer or the polymer of the diene compound, though the oxygen-absorbing performance is low. In addition, the odor generation can be reduced by some other methods. For example, in the case of the chemical crosslinking, the low-molecular weight compounds derived from a radical generator are present, and also with regard to these compounds, molecules having the largest possible molecular weights after radical cleavage are selected or molecules having the smallest possible molecular weights after radical cleavage are selected and removed after the crosslinking. On the other hand, as a technique for removing the odor whose generation cannot be avoided after the oxidation, an adsorbent such as active carbon may be used together with the oxygen-absorbing component.

The oxygen-absorbing component of the present invention is the main component of the oxygen absorbent package and the oxygen-absorbing body, and it can be used singly or together with a drying component, an adsorbing component or an antibacterial component, and also together with another oxygen-absorbing component.

The oxygen-absorbing component of the present invention can be used as an oxygen absorbent package having the form of gas permeable sachets containing the powdery or the particulate oxygen-absorbing component directly; as an oxygen absorbent package having a form in which a small piece obtained by drawing a thermoplastic resin kneaded with the oxygen-absorbing component is placed in a sachet, or a form such as a label type, a card type or a packing type containing the small piece; as an oxygen-absorbing packaging material such as a film or a sheet in which the oxygen-absorbing component is kneaded with the thermoplastic resin; or as a constitutional portion in part or in whole of a packaging bag or a packaging container.

Next, the oxygen absorbent package of the present invention will be described.

In the oxygen absorbent package of the present invention, when it is intended that a large amount of oxygen is absorbed by the use of a relatively large amount of the crosslinked polymer, the quantity of heat generated during the oxygen absorption increases, and if the release of the heat is poor, the temperature rise (heat accumulation) of the crosslinked polymer and the influence of this temperature rise on various products cannot be ignored any more. As measures against this inconvenience, in order to space away a plurality of powdery granules or particles from each other, other powdery granules or particles which are thermally stable and which have no oxygen-absorbing function may be added. For the sake of this purpose, it is possible to utilize any of inorganic compounds and organic compounds having a large heat capacity. Among them, as the compounds having the large heat capacity, thermoplastic resins are particularly preferable which have a melting point of about 100° C. or lower and which can absorb the heat even by phase change.

Not only for the prevention of the above-mentioned heat accumulation but also for the prevention of the flying of the powder and particles and for the prevention of eating by mistake, it is preferable to prepare an integrated mixture by kneading the crosslinked polymer with any of the various thermoplastic resins so that the crosslinked polymer may be dispersed in the thermoplastic resin. In the case of the integrated mixture, if the mixture is directly used as such, the oxygen-absorbing rate of the crosslinked polymer lowers owing to the shielding of the thermoplastic resin. Therefore, it is particularly preferable that the mixture is drawn to make it continuously porous. Furthermore, as another technique of forming the porous state, foaming is also possible.

When it is intended to obtain the continuously porous state by the drawing, the powder or the particle of the crosslinked polymer are required to be kneaded with the thermoplastic resin at a relatively high volume fraction. This volume fraction is preferably in the range of about 0.10 to 0.60, more preferably 0.20 to 0.40. If the volume fraction is too low, the continuously porous state is not obtained in the drawn mixture, and on the other hand, if it is too high, the drawn mixture is brittle. Here, the density of the crosslinked polymer and that of the thermoplastic resin are similar to each other, and therefore, an addition ratio of the crosslinked polymer is preferably about 10 to 60 wt %, more preferably 20 to 40 wt %. Furthermore, in the case that the crosslinked polymer is kneaded together with other components, the total volume fraction of these substances should be in this range.

In the case that the crosslinked polymer is kneaded with any of various thermoplastic resins to form the integrated mixture, it is possible to simultaneously knead other components, or a combination of the crosslinked polymer and each of suitable components may be kneaded to form different layers, thereby obtaining a multilayered structure. For this formation of the multilayered structure, there can be used any of usually known techniques such as co-extrusion, extrusion coating, extrusion laminating, thermal laminating and dry laminating.

As a packaging material for the oxygen absorbent package of the present invention, there can be used various known gas-permeable monolayered and multilayered materials (resin films, papers and the like). Here, if oxygen is absorbed from a gaseous phase, both of a non-porous (no through-holes across the total thickness) layer and a porous layer can be used, and the highly gas-permeable porous layer is particularly desirable. Furthermore, when oxygen is absorbed from an object having a high liquid content, or when the oxygen-absorbing is done by immersing the oxygen absorbent package in the liquid, the non-porous layer is preferable, and in many cases, it is essential that the material of the oxygen absorbent package is the non-porous layer.

The gas permeability of the packaging material is such that an oxygen permeability rate of this packaging material is preferably higher, more preferably double figures higher than an oxygen absorption rate of the crosslinked polymer. In such a case, the oxygen permeability of the packaging material is not a rate-determining step, and the oxygen-absorbing rate, which the crosslinked polymer as the oxygen-absorbing component inherently has, can sufficiently be exerted. A typical value of the oxygen permeability rate of such a packaging material varies depending on the oxygen-absorbing rate and the amount of the oxygen-absorbing component and the area of the packaging material. For example, when 5 g of the oxygen-absorbing component having a maximum oxygen-absorbing rate of 10 $cm^3/g/h$ is used and the total area of the packaging material is 50 $cm^2$, the oxygen permeability rate by calculation is preferably not less than $10 \times 5/50 = 1.0$ [$cm^3/cm^2/h$], more preferably not less than 100 [$cm^3/cm^2/h$]. However, in the case of absorbing oxygen from air (a total pressure=$1.013 \times 10^5$ Pa), nitrogen also simultaneously permeates through the packaging material, so that the permeability rate of air is about 5 times as much as the above-mentioned value. After all, the calculated air permeability is preferably not less than $1.0 \times 5/(1.013 \times 10^5) = 4.9 \times 10^{-5}$ [$cm^3/cm^2/h/Pa$], more preferably not less than $4.9 \times 10^{-3}$ [$cm^3/cm^2/h/Pa$].

In terms of a Gurley type permeability (a time required for 100 $cm^3$ of a gas to permeate through the packaging material in a standard device, JIS P8117) which is often used in the field of the packaging material, the above-mentioned value of the air permeability corresponds to $6.5/(4.9 \times 10^{-5}) = 1.3 \times 10^5$ [s/100 $cm^3$] or less, more preferably $1.3 \times 10^3$ [s/100 $cm^3$] or less (in this case, the conversion is made on condition that a pressure difference which is applied at the measurement of the air permeability is 8600 Pa, and the area is 6.45 $cm^2$).

It is usually difficult to realize such an air permeability as in the above-mentioned example by the use of the non-porous layer, since the layer is made unreasonably thin. In consequence, selection is made between the employment of the packaging material having a larger area or the allowance of lowered rate. On the other hand, if a porous layer, particularly a layer having such through-holes as to be visually confirmed is used, this permeability can easily be realized.

With regard to the packaging material, a plurality of packaging materials may be used to form a multiple package, or in order to impart water resistance or oil resistance to the packaging material, it may beforehand be impregnated with a water-repellent reagent or an oil-repellent reagent having a high safety. Furthermore, it is also possible that a tackified portion may be added to a certain position on the outer side of the packaging material to form a label type oxygen absorbent, that a rigid base material may be used in a certain portion of the packaging material to form a card type oxygen absorbent, or that a flexible base material may be used in a certain portion of the packaging material to form a packing type oxygen absorbent.

The oxygen-absorbing component of the present invention can be incinerated at its disposal after the oxygen-absorbing treatment without any problem, and the biological degradation of the oxygen-absorbing component can also be expected. Therefore, if ecologically acceptable materials such as biologically degradable resins and papers are used as the thermoplastic resin with which the oxygen-absorbing component is kneaded and the packaging material, the disposal of the whole oxygen absorbent package can be done with little trouble.

The oxygen-absorbing component of the present invention is free from any metallic element in a metallic state and large size. Accordingly, the oxygen-absorbing component scarcely interacts with electromagnetic waves, so that it does not activate a metal detector. Moreover, also in a microwave oven, the oxygen-absorbing component is scarcely heated. These characteristics of the oxygen-absorbing component can be maintained similarly in the oxygen absorbent package.

The oxygen absorbent package of the present invention can be put, together with the substance which is the object of the oxygen-absorbing, in any of usually known gas-barrier containers and packages such as bags, resin containers, metallic cans and glass containers which comprise the films of resins and the like, whereby the substance can be preserved.

The amount of the oxygen-absorbing component which is practically used can be decided in consideration of a degree of gas-barrier properties of the above-mentioned container or package, a volume of oxygen in the container or the package, a desired period time for completing the oxygen-absorbing treatment and other factors. In the usual case that the gas-barrier properties of the container or the package are high and an oxygen-absorbing term is within several days, it is preferred to use the oxygen-absorbing component in an amount capable of absorbing oxygen about twice or thrice as much as the volume of oxygen, or in the case that the gas-barrier properties of the container or the package are low and the oxygen-absorbing term is short, it is preferred to use a larger amount of the oxygen-absorbing component.

Figure 2:
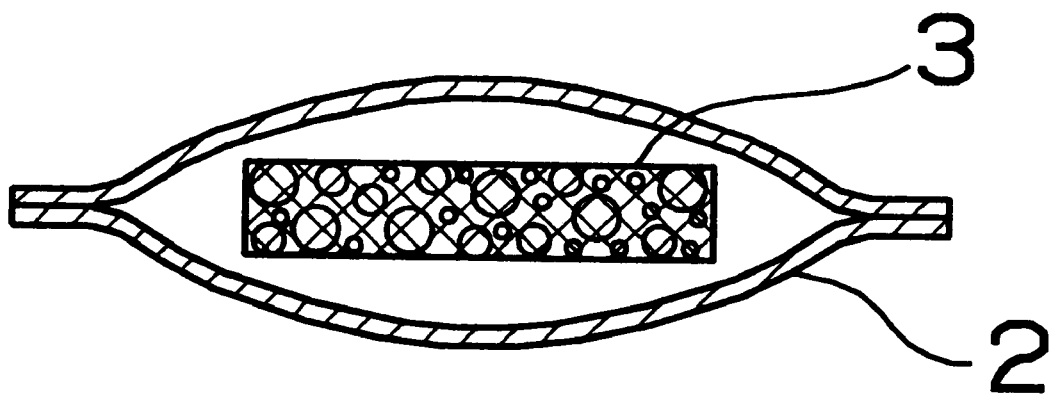
FIG. 2 is a sectional view of a sachet type oxygen absorbent package in which a small piece obtained by kneading components containing the oxygen-absorbing component with a thermoplastic resin and then drawing the mixture to make it porous is put in the sachet made of the gas permeable packaging material.
Figure 3:
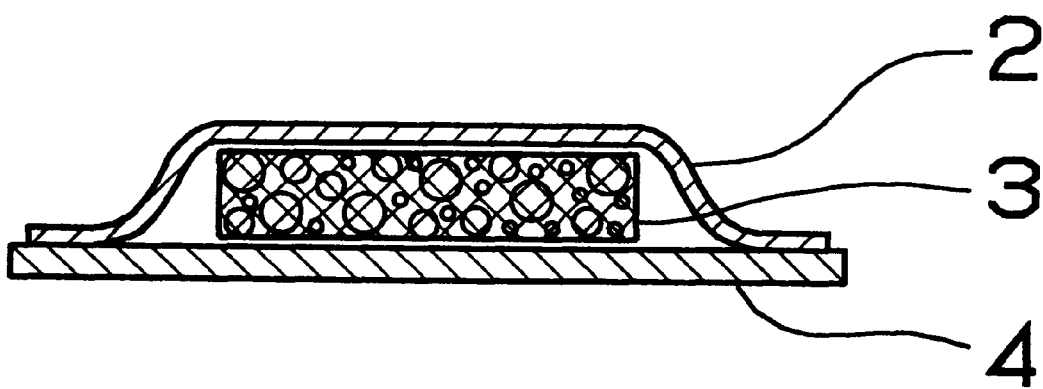
FIG. 3 is a sectional view of a label type oxygen absorbent package in which a small piece obtained by kneading the components containing the oxygen-absorbing component with the thermoplastic resin and then drawing the mixture to make it porous is put in a gas permeable packaging material having a tackified portion on part of its outside.
Figure 4:
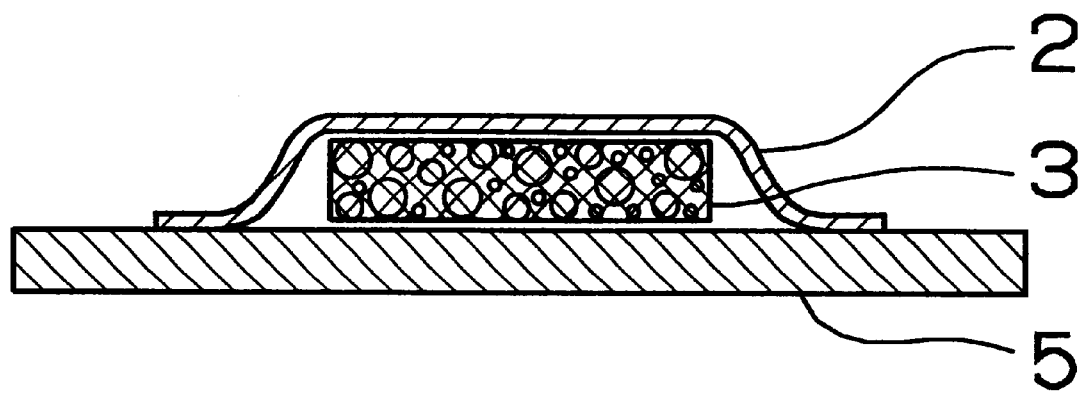
FIG. 4 is a sectional view of a card type or a packing type oxygen absorbent package in which a small piece obtained by kneading the components containing the oxygen-absorbing component with the thermoplastic resin and then drawing the mixture to make it porous is put in a gas permeable packaging material using a rigid base material or a flexible base material on part thereof.

FIG. 1 shows a sachet type oxygen absorbent package in which all the components including the oxygen-absorbing component are put in a sachet made of a gas permeable packaging material. FIG. 2 shows a sachet type oxygen absorbent package in which a small piece obtained by kneading all the components including the oxygen-absorbing component with a thermoplastic resin and then drawing the mixture to make it porous is put in the sachet. FIG. 3 shows a label type oxygen absorbent package in which the same small piece as in FIG. 2 is put in a packaging material having an adhesive portion on part of its outside. FIG. 4 shows a card type or a packing type oxygen absorbent package in which the same small piece as in FIG. 2 is put in a packaging material using a rigid base material or a flexible base material in a portion thereof.

Next, the oxygen-absorbing monolayered body and multilayered body of the present invention will be described.

In the oxygen-absorbing monolayered body and multilayered body of the present invention, any of various usually known thermoplastic resins can be used as a thermoplastic resin which can be used for an oxygen-absorbing layer, and in the case that oxygen is allowed to permeate through the oxygen-absorbing layer itself, a resin having low gas-barrier properties can be used, or in the case that the oxygen-absorbing layer itself is required to possess the gas-barrier properties, any of various resins having high gas-barrier properties can be used.

No particular restriction is put on the size of the crosslinked polymer which is used for the oxygen-absorbing layer, so long as the maximum particle size of the crosslinked polymer is about less than the thickness of the oxygen-absorbing layer. However, from the viewpoints of an oxidation rate and the protection of the other layers from damage (the protection of the other layers from being pierced), the crosslinked polymer is preferably in the state of fine particles. However, if the crosslinked polymer is too fine, there is a danger such as dust explosion, and hence, prudent handling is required. In addition, it is also noted that the fine crosslinked polymer is usually expensive. After all, the average particle diameter of the crosslinked polymer is preferably in the range of 10 to 100 $\mu$m, more preferably in the range of about 30 to 50 $\mu$m.

In the oxygen-absorbing layer, the volume fraction of the crosslinked polymer which is the oxygen-absorbing component is preferably in the range of 0.01 to 0.60 so as to obtain the intended oxygen-absorbing performance and so as to keep the strength of the oxygen-absorbing layer. The higher this volume fraction is, the higher the oxygen-absorbing performance is, but the lower the strength of the layer is.

The thickness of the oxygen-absorbing layer can substantially be decided by the required total amount of oxygen to be absorbed. That is to say, the thickness of the oxygen-absorbing layer including the minimum amount of the oxygen-absorbing component by which all of oxygen in air as the object of the oxygen-absorbing can be absorbed is the minimum thickness of the oxygen-absorbing layer. In general, in consideration of more or less amount of oxygen entering from the outside during a long-term storage of contents, the oxygen-absorbing component is used in an amount twice or thrice as much as this minimum amount of the oxygen-absorbing component, and therefore, the thickness of the oxygen-absorbing layer is also fundamentally twice or thrice as much as the minimum thickness of the oxygen-absorbing layer.

When the crosslinked polymer is kneaded with the thermoplastic resin to form the oxygen-absorbing layer which is an integrated mixture, the oxygen-absorbing rate of the crosslinked polymer lowers owing to the shielding of the crosslinked polymer with the thermoplastic resin, if the oxygen-absorbing layer remains as it is. Thus, it is desirable to make the oxygen-absorbing layer continuously porous (hereinafter referred to as "the porous oxygen-absorbing layer"). As a technique for making continuously porous, drawing is particularly useful, but another technique such as foaming is also possible.

In the present invention, for the purposes of protecting the oxygen-absorbing layer, preventing the oxygen-absorbing layer from being contaminated with the oxygen-absorbing component, and preventing oxygen from permeating through the oxygen-absorbing layer from the outside, other layers can further be laminated on at least one surface of the oxygen-absorbing layer. That is to say, if both of the substantially complete prevention of the contamination with the oxygen-absorbing component and the acquisition of a high oxygen-absorbing rate are simultaneously intended, a layer comprising a non-porous resin (hereinafter referred to as "the non-porous layer") is necessary, and the oxygen permeability of the layer is preferably in the range of $1 \times 10^{-11}$ to $6 \times 10^{-9}$ [cm$^3$/cm$^2$/s/Pa]. Furthermore, if a higher oxygen permeability is required while the contamination with the oxygen-absorbing component is suitably prevented, the continuously porous layer (hereinafter referred to as "the porous layer") is desirable. This porous layer can also be used for the sake of the protection of the non-porous layer, if this non-porous layer is thin. In addition, if it is intended to prevent the permeation of oxygen from the outside, a gas-barrier layer comprising a specific material is necessary, and the oxygen permeability of this gas-barrier layer is preferably $1 \times 10^{-12}$ [cm$^3$/cm$^2$/s/Pa] or less. In order to combine these layers just mentioned with the oxygen-absorbing layer or the porous oxygen-absorbing layer, there may be additionally formed an adhesive layer, an adhesive resin layer (a fusion layer, if it is intended to melt this layer) and another necessary resin layer. For the formation of a multilayer structure of these layers, usually known techniques such as co-extrusion, extrusion coating, extrusion laminating, thermal laminating and dry laminating can be used singly or in a combination thereof.

Examples of the resin having the relatively high oxygen permeability include homopolymers and copolymers of olefins such as ethylene, propylene, 1-butene and 4-methyl-1-pentene, ethylene-vinyl acetate copolymer, polybutadiene, polyisoprene, styrene-butadiene copolymer, hydrogenated polymers thereof, various silicone resins, and modified compounds, grafted compounds and mixtures of these compounds.

As a resin for use in the non-porous layer, a resin having a suitable oxygen permeability coefficient corresponding to the oxygen-absorbing performance required for the oxygen-absorbing multilayered body can be selected from the above-mentioned resins. In the case that the required performance is low, no particular restriction is put on the oxygen permeability coefficient, but in order to comply with a wider range required, the oxygen permeability coefficient is preferably not less than $1\times10^{-13}$ [$cm^3 \cdot cm/cm^2/s/Pa$], more preferably not less than $1\times10^{-12}$ [$cm^3 \cdot cm/cm^2/s/Pa$].

The thickness of the non-porous layer can be decided by the required performance of the object of the oxygen-absorbing which can be represented by an oxygen permeability and the oxygen permeability coefficient of the selected resin. Nevertheless, the non-porous layer is preferably as thin as possible, provided that the non-porous layer can stably be manufactured without any occurrence of pinholes and causes neither the pinholes nor breakage even when brought into contact with the contents during a usual use, and the thickness of the non-porous layer is preferably in the range of about 5 to 20 $\mu m$. Alternatively, the non-porous layer may be constituted of a plurality of layers.

Preferable examples of a material having the low oxygen permeability for use in the gas-barrier layer include usually known materials, i.e., gas-barrier resins such as polyesters such as polyethylene terephthalate, polyamides such as nylon 6 and nylon MXD, chlorine-containing resins such as polyvinyl chloride and polyvinylidene chloride, ethylene-vinyl alcohol copolymer, coated compounds thereof, metals such as aluminum foil and deposited aluminum on the resin, and inorganic compounds such as deposited silicon oxides on the resin.

The thickness of the gas-barrier layer is decided by required gas-barrier properties, strength and the material of the gas-barrier layer.

In the case that the gas-barrier layer is formed later, this layer can be adhered or fused in a usual manner such as thermal laminating, dry laminating or extrusion coating to obtain the final multilayered structure. Here, in the case that the porous oxygen-absorbing layer is used and the gas-barrier layer is directly adhered or fused to this porous oxygen-absorbing layer, an adhesive or a molten adhesive resin penetrates into the continuous pores, so that oxygen permeability inconveniently deteriorates. In addition, there is a risk that the adhesion is difficult owing to the unevenness of the surface of the porous oxygen-absorbing layer by the oxygen-absorbing component. As a technique of avoiding these problems, a resin layer (hereinafter referred to as "the buffer layer") for protecting the continuous pores and smoothing the layer surface is preferably previously laminated on the surface of the oxygen-absorbing layer on which the gas-barrier layer is to be laminated, and after the drawing of these layers, the gas-barrier layer having the low oxygen permeability is preferably adhered or fused on the buffer layer. In the case that the porous oxygen-absorbing layer or both of the porous oxygen-absorbing layer and the porous layer having the continuous pores are formed by the drawing, it is necessary to knead the powder or the particles of the crosslinked polymer having the relatively high volume fraction or another filler with the thermoplastic resin. In this case, the value of volume fraction should be as described above.

No particular restriction is put on the oxygen permeability of the resin for use in the porous oxygen-absorbing layer and the porous layer, because the oxygen permeability can be improved by the drawing to form the continuous pores.

The filler for use in the formation of the continuous pores in the porous layer is not particularly limited, so long as it is a water-insoluble or sparingly water-soluble unmeltable inorganic or organic material, but if the oxygen-absorbing film which can be used in the case that the contents are an acidic liquid is intended, it is necessary that the filler does not elute even under the acidic conditions. Furthermore, a filler such as an oxide having a low risk of combustion is preferable.

No particular restriction is put on the particle diameter of the filler, so long as it can easily be handled at operations inclusive of the addition of the resin, but in order to prevent another layer from damaging and to protect the non-porous layer from a damage by the filler, the particle diameter of the filler is preferably less than the thickness of the non-porous layer, and more preferably the filler is finer and its maximum particle diameter is 10 $\mu m$ or less.

The thickness of the porous layer is required to be such that the non-porous layer can be protected from an external force and a damage by the oxygen-absorbing component particles and can be reinforced by the porous layer itself, and the thickness of the porous layer is preferably not less than the maximum particle diameter of the crosslinked polymer. On the other hand, if the porous layer is excessively thick, the whole oxygen-absorbing film is too thick. Hence, the maximum thickness of this layer should be about 10 times as much as the maximum particle diameter of the crosslinked polymer particles.

The drawing may be accomplished by using any technique of uniaxial drawing, biaxial simultaneous drawing and biaxial successive drawing. At this time, a drawing temperature is preferably lower than a temperature around the melting temperature of the resin used (when a plurality of resins are used, the lowest melting temperature), and a drawing magnification is preferably in the range of 2 to 20 times in terms of an area.

As described above, the oxygen-absorbing component of the present invention can be incinerated at its disposal after the oxygen-absorbing treatment almost without any problem, and the biological degradation of the oxygen-absorbing component can also be expected. Therefore, if ecologically acceptable materials such as biologically degradable resins are used as the thermoplastic resin and the gas-barrier material for use in the oxygen-absorbing mono-layered body and multilayered body, the disposal of the whole oxygen-absorbing monolayered body and multilayered body can be done with little trouble.

The oxygen-absorbing component of the present invention does not activate a metal detector as described above, and moreover, also in a microwave oven, the oxygen-absorbing component is scarcely heated. These characteristics of the oxygen-absorbing component can be maintained similarly in the oxygen-absorbing layer, and the oxygen-absorbing layer can be kept transparent or semitransparent.

To the materials constituting the respective layers, various additives other than the above-mentioned materials can be added. Examples of these additives include a pigment and a dye for coloring and concealing, a stabilizing component for the prevention of oxidation and decomposition, an antistatic component, a drying component for a hygroscopic treatment, an adsorbing component for deodorization, an antibacterial component, a plasticizing component and a flame-retardant component. Furthermore, the crosslinked polymer may be used together with another oxygen-absorbing component. These additives can suitably be added to the selected layers. Similarly, it is also possible to add a printed layer, an easily openable layer, an easily peelable layer or the like.

An oxygen-absorbing body of the present invention can be used as an oxygen-absorbing packaging material of a part or all of a packaging bag or a packaging container in various forms. Typical examples of these forms include an oxygen-absorbing bag, an inner bag, an inside partition, a container body, a top seal film (a lid) and a bottle. In particular, if a layer constitution contains the non-porous layer, a solid, a liquid, and both of the solid and the liquid can be applied as the contents.

Examples of the typical layer constitution of the oxygen-absorbing monolayered body and multilayered body of the present invention include constitutions free from barrier layer (both-side absorption types) such as A1 (a single layer), A2 (a single layer), B/A1/B, B/A2/B, C/A2/C and B/C/A2/C/B, constitutions including the barrier layer on one-side (one-side absorption types) such as B/A1/D, B/A1/E/D, B/A2/D, B/A2/E/D, B/A2/F/E/D, B/C/A2/E/D and B/C/A2/F/E/D, and constitutions including the barrier layers on both-sides (improved barrier types) such as D/A1/D and D/E/A1/E/D wherein A1 is an oxygen-absorbing layer containing the crosslinked polymer as the oxygen-absorbing component; A2 is a porous oxygen-absorbing layer containing the crosslinked polymer as the oxygen-absorbing component; B is a non-porous layer; C is a porous layer; D is a barrier layer; E is an adhesive layer (an adhesive or an adhesive resin); F is a buffer layer.

Figure 5:
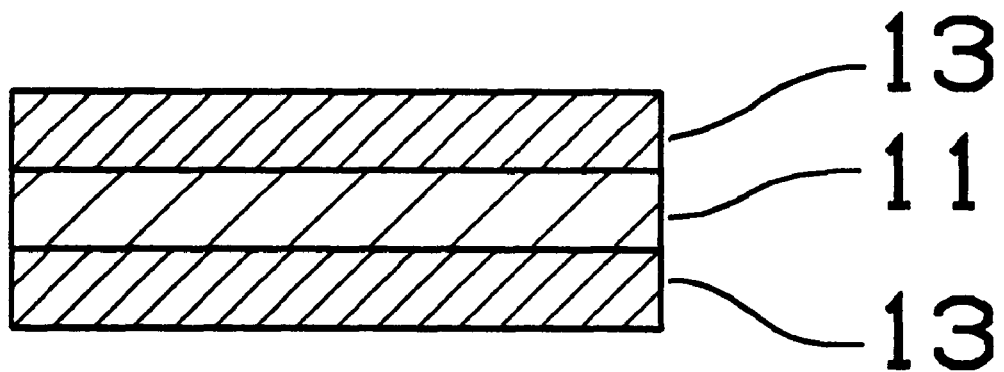
FIG. 5 is a sectional view of an oxygen-absorbing multilayered body having an inner structure of a non-porous layer/an oxygen-absorbing layer/the non-porous layer.
Figure 6:
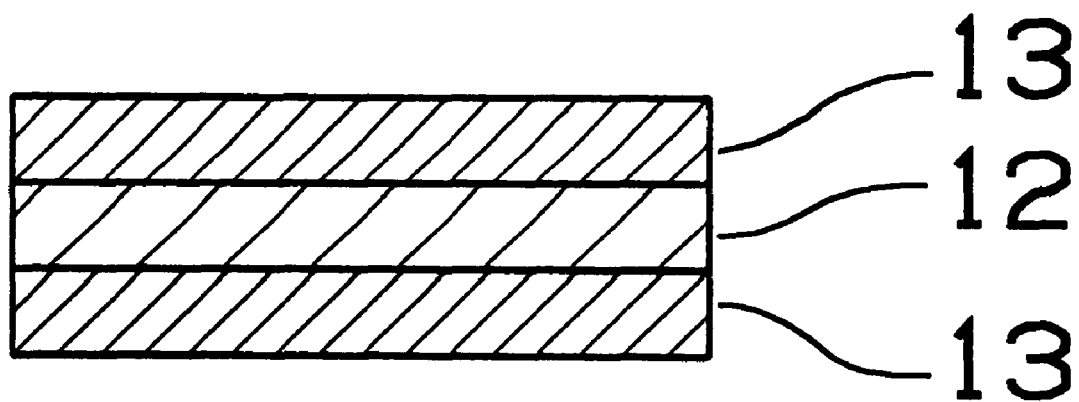
FIG. 6 is a sectional view of an oxygen-absorbing multilayered body having an inner structure of the non-porous layer/a porous oxygen-absorbing layer/the non-porous layer.
Figure 7:
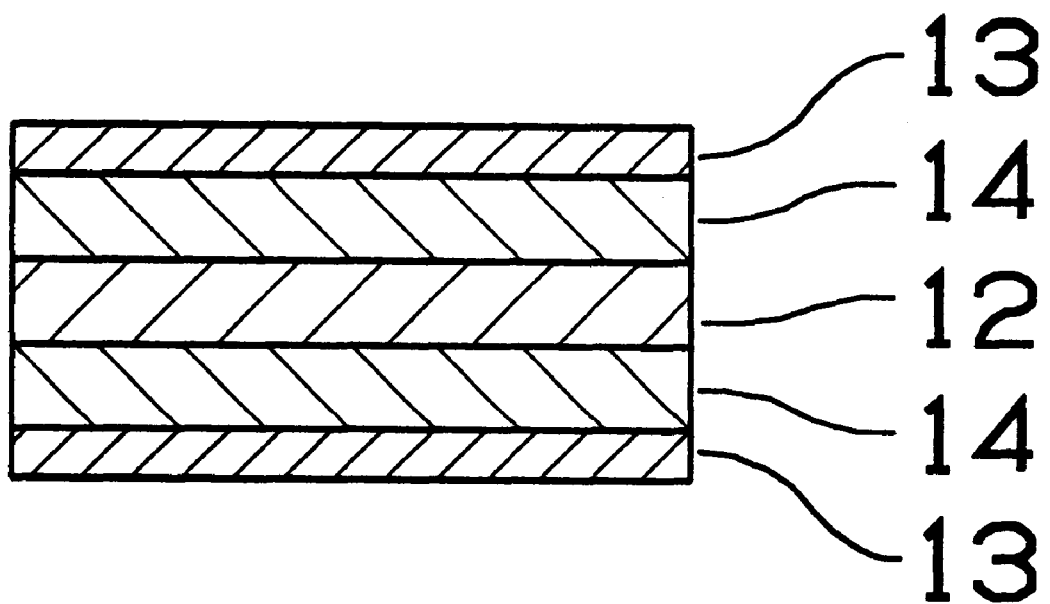
FIG. 7 is a sectional view of an oxygen-absorbing multilayered body having an inner structure of the non-porous layer/a porous layer/the porous oxygen-absorbing layer/the porous layer/the non-porous layer.
Figure 8:
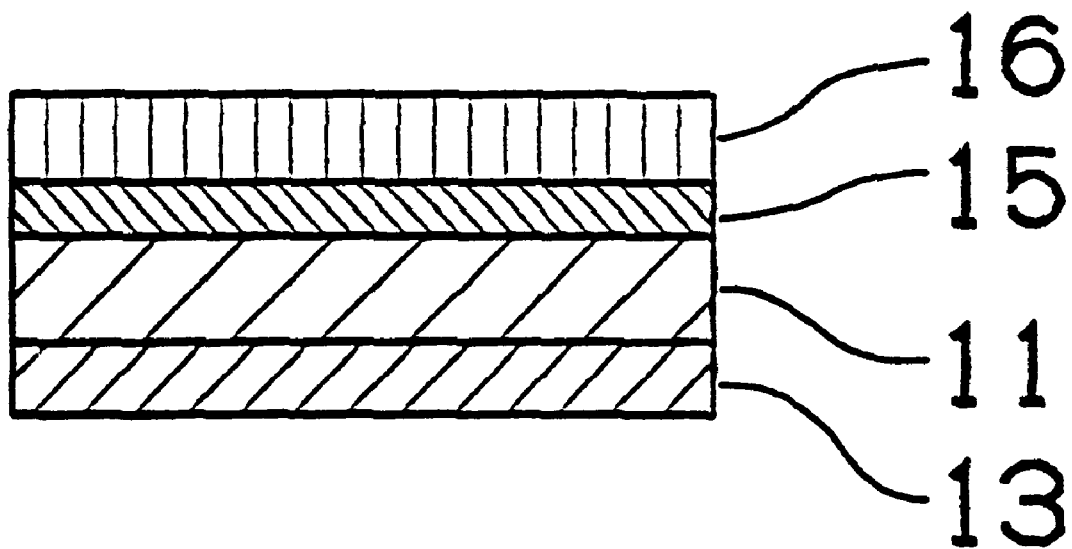
FIG. 8 is a sectional view of an oxygen-absorbing multilayered body having an inner structure of the non-porous layer/the oxygen-absorbing layer/an adhesive layer/a barrier layer.
Figure 9:
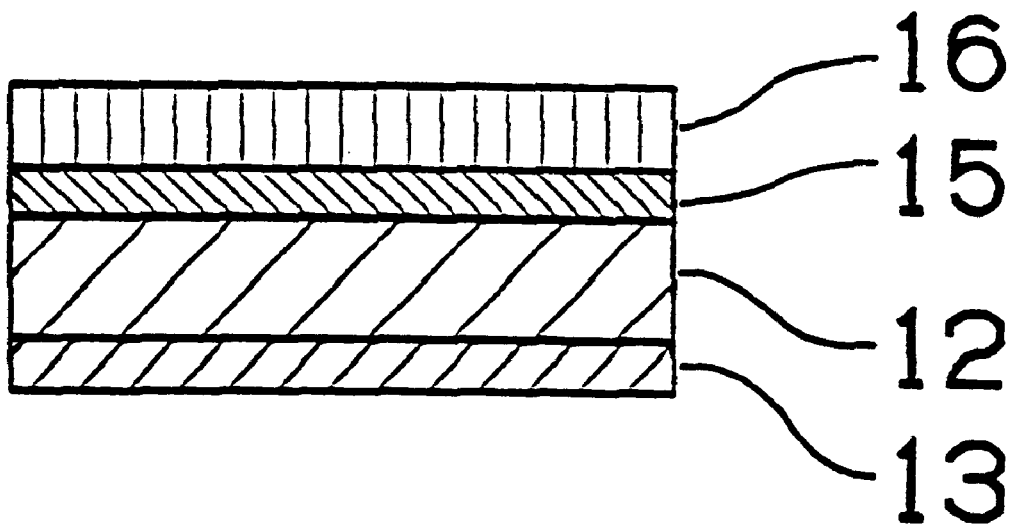
FIG. 9 is a sectional view of an oxygen-absorbing multilayered body having an inner structure of the non-porous layer/the porous oxygen-absorbing layer/the adhesive layer/the barrier layer.
Figure 10:
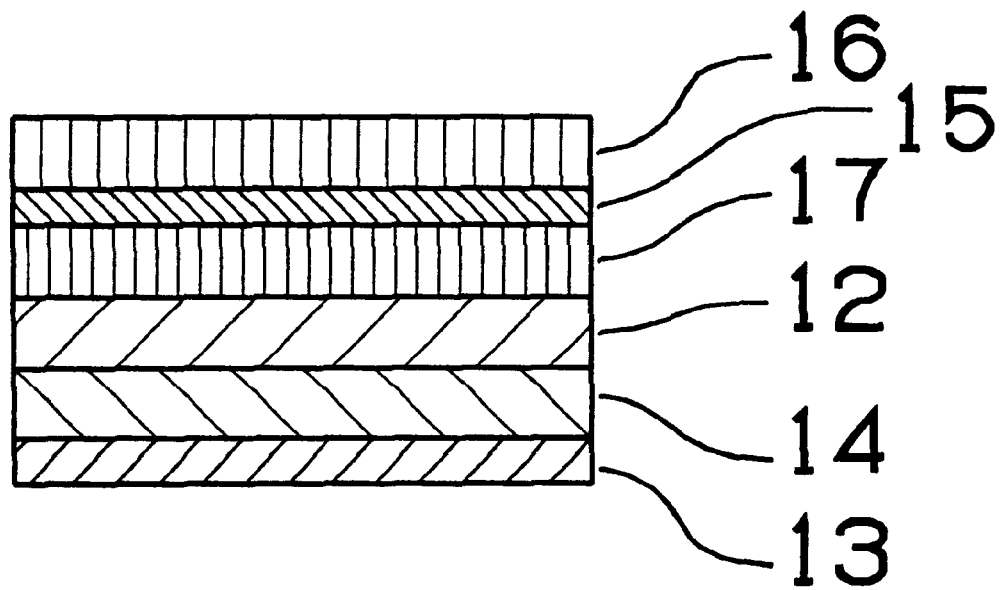
FIG. 10 is a sectional view of an oxygen-absorbing multilayered body having an inner structure of the non-porous layer/the porous layer/the porous oxygen-absorbing layer/a buffer layer/the adhesive layer/the barrier layer.
Figure 11:
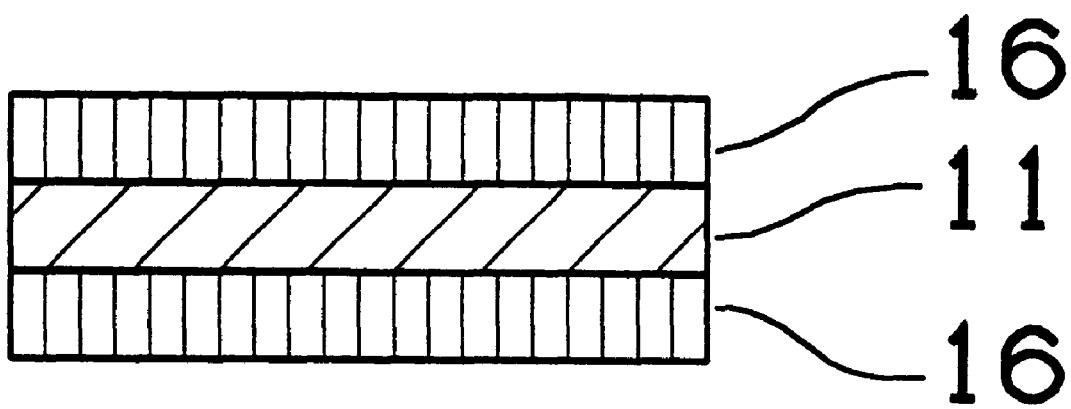
FIG. 11 is a sectional view of an oxygen-absorbing multilayered body having an inner structure of the barrier layer/the oxygen-absorbing layer/the barrier layer.
Figure 12:
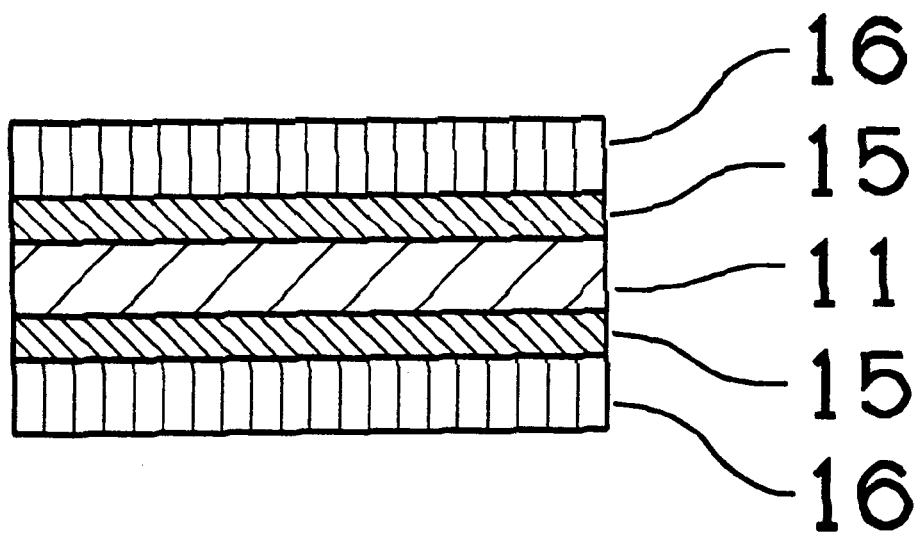
FIG. 12 is a sectional view of an oxygen-absorbing multilayered body having an inner structure of the barrier layer/the adhesive layer/the oxygen-absorbing layer/the adhesive layer/the barrier layer.
Figure 13:
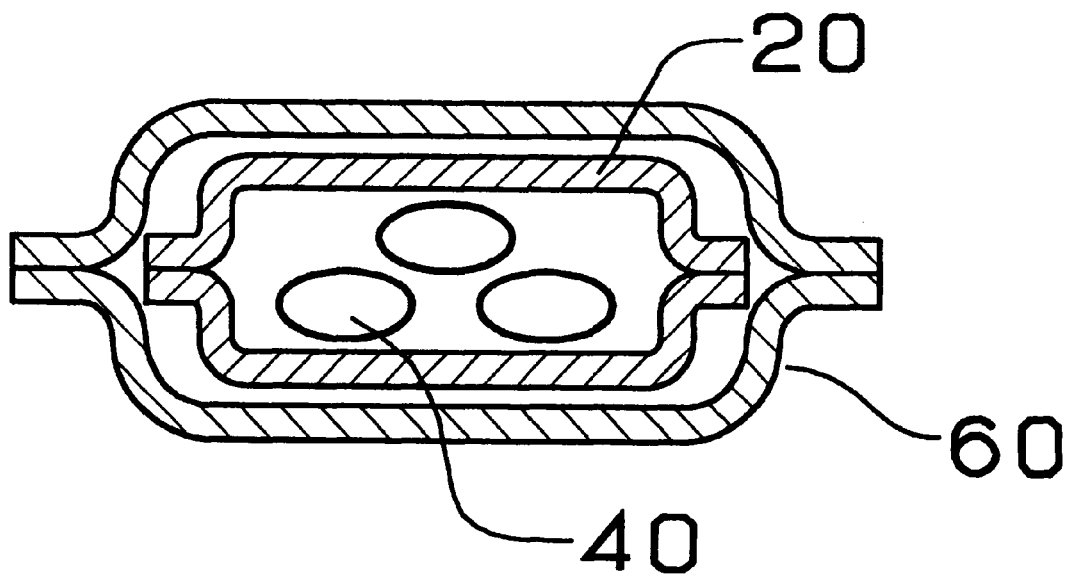
FIG. 13 is a sectional view of an example in which a both-side absorption type oxygen-absorbing multilayered body is used as an inside bag for packaging.
Figure 14:
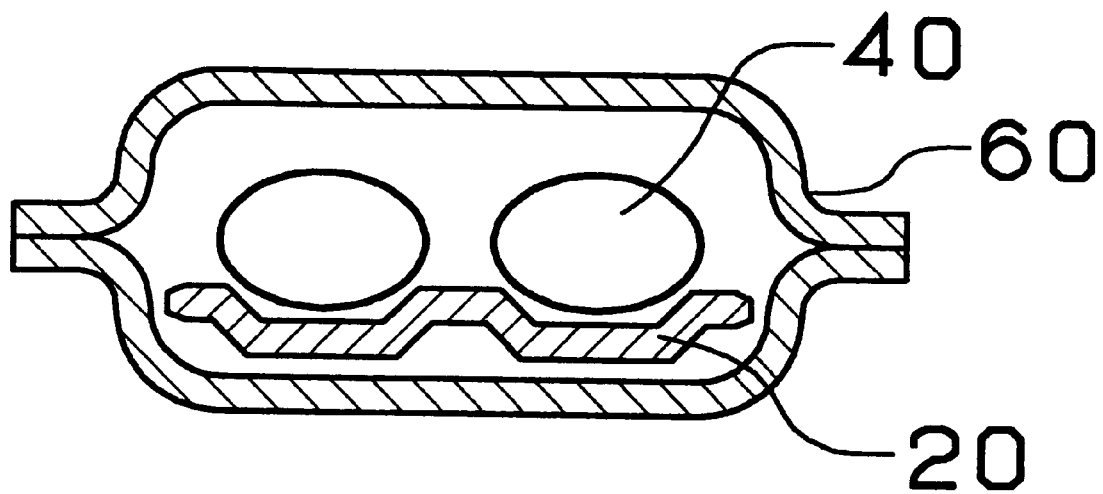
FIG. 14 is a sectional view of an example in which a both-side absorption type oxygen-absorbing multilayered body is used as an inside partition.
Figure 15:
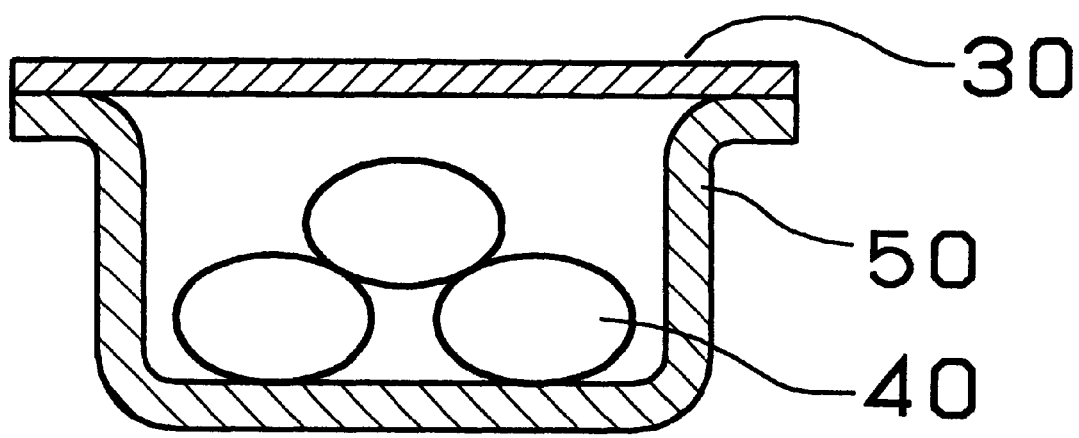
FIG. 15 is a sectional view of an example in which a one-side absorption type oxygen-absorbing multilayered body is used as a top seal film of a packaging container.
Figure 16:
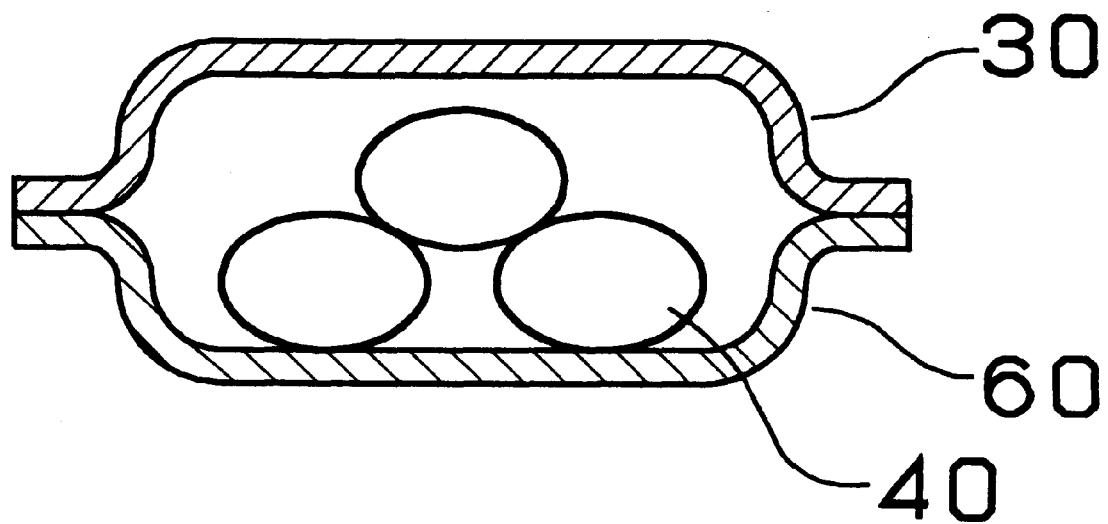
FIG. 16 is a sectional view of an example in which a one-side absorption type oxygen-absorbing multilayered body is used as a part of a packaging bag.

As the both-side absorption type oxygen-absorbing multilayered bodies, FIG. 5 shows the non-porous layer/oxygen-absorbing layer/non-porous layer; FIG. 6 shows the non-porous layer/porous oxygen-absorbing layer/non-porous layer; and FIG. 7 shows the non-porous layer/porous layer/porous oxygen-absorbing layer/porous layer/non-porous layer. As the one-side absorption type oxygen-absorbing multilayered bodies, FIG. 8 shows the non-porous layer/oxygen-absorbing layer/adhesive layer/barrier layer; FIG. 9 shows the non-porous layer/porous oxygen-absorbing layer/adhesive layer/barrier layer; and FIG. 10 shows the non-porous layer/porous layer/porous oxygen-absorbing layer/buffer layer/adhesive layer/barrier layer. As the improved barrier type oxygen-absorbing multilayered bodies, FIG. 11 shows the barrier layer/oxygen-absorbing layer/barrier layer; and FIG. 12 shows the barrier layer/adhesive layer/oxygen-absorbing layer/adhesive layer/barrier layer. FIGS. 13 and 14 show embodiments in which the both-side absorption type oxygen-absorbing films are used as an inner bag for packaging and an inside partition, respectively. In an embodiment shown in FIG. 14, an oxygen-absorbing film is partially molded, and the edge of the film is thermally fused. FIGS. 15 and 16 show embodiments in which the one-side absorption type oxygen-absorbing films are used as a top seal film of a packaging container and a part of the packaging bag, respectively.

Next, the present invention will be described in more detail with reference to examples and comparative examples, but the scope of the present invention shall not be limited by these examples.

Compounds and materials used in the examples and the comparative examples are as follows.

[Materials to be crosslinked]

As the materials to be crosslinked, the following materials were used.

Butadiene oligomer: Made by Nippon Zeon Co., Ltd., trade name: Polyoil 110, average molecular weight: 1600, 1,4 structure: 99%, liquid having a viscosity of 750 cP at 20° C., and number of carbon-carbon double bonds: 1/54= 0.0185 mol/g wherein 54 is the molecular weight of a monomer.

Butadiene oligomer: Made by Nippon Zeon Co., Ltd., trade name: Polyoil 130, average molecular weight: 3000, 1,4 structure: 99%, liquid having a viscosity of 3000 cP at 20° C., and number of carbon-carbon double bonds: 0.0185 mol/g as in the case of Polyoil 110.

Polyisoprene: Made by Japan Synthetic Rubber Co., Ltd., trade name: IR 2200, 1,4 structure: 98%, average molecular weight: about $10^6$, number of carbon-carbon double bonds: 1/68=0.0147 mol/g wherein 68 is the molecular weight of a monomer, and flexural modulus at 25° C.: 1.0 MPa (which is measured in an undermentioned manner).

Styrene butadiene copolymer: Made by Japan Synthetic Rubber Co., Ltd., trade name: E-SBR 1500, random copolymer containing 23.5% of bonded styrene, average molecular weight: about $4 \times 10^5$, number of carbon-carbon double bonds derived from butadiene: (1−0.235)/54=0.0142 mol/g, and elastic modulus at 25° C.: 1.1 MPa (which is measured in an undermentioned manner).

[Organic peroxide]

α,α'-bis(tert-butylperoxy)diisopropylbenzene: Made by NOF Corp., trade name: Perbutyl P, molecular weight: 338, number of effective functional groups per mol: 2 mol, and purity: 95%.

[Catalysts]

The following three species were used.

Cobalt stearate: Made by Mitsuwa Chemical Ltd., and purity: 98%

Tall oil fatty acid manganese salt: Made by Toei Chemical Industry Co., Ltd., and purity: 97%

Iron stearate (III): Made by Mitsuwa Chemical Ltd., and purity: 95% or more

[Adsorbent]

As the adsorbents, in the examples regarding oxygen-absorbing component and oxygen absorbent packages, active carbon particles were used which were obtained by sieving an active carbon (made by Takeda Chemical Industries, Ltd., trade name: Sirasagi A) to collect particles having a size of 50 μm or more. Furthermore, in the examples regarding oxygen-absorbing monolayered bodies and multilayered bodies, another active carbon (made by Takeda Chemical Industries, Ltd., trade name: Sirasagi Fac-10, average particle diameter: 10 μm) was used.

[Antistatic component]

Glycerol monostearate: Made by NOF Corp., trade name Monogly M, purity: 95% or more Compounds and materials which were used to prepare oxygen absorbent packages, oxygen-absorbing monolayered bodies and multilayered bodies were as follows.

[Packaging materials]

As the packaging materials, there were used combinations of a laminate of a perforated polyethylene film and a paper, having an air permeability of about $2 \times 10^{-4}$ [cm$^3$/cm$^2$/h/Pa], a polyethylene film one surface of which was coated with an adhesive (before this film was applied to another, a peelable film was stuck to the adhesive side), a laminate of a paper having a thickness of about 1 mm and a polyethylene film thereon, and a foamed polyethylene sheet having a thickness of about 0.5 mm.

[Thermoplastic resins]

The following thermoplastic resins were used.

Polypropylene: Made by Japan Polychem Corp., trade name NOVATEC PP FG3D, polypropylene in accordance with the classification of products, but in fact, copolymer containing a small amount of ethylene, melt flow rate: 7.0 g/10 min (230° C.), oxygen permeability coefficient at 25° C.: $1.3 \times 10^{-13}$ [cm$^3$·cm/cm$^2$/s/Pa].

Polyethylene (straight-chain low-density polyethylene): Made by Mitsui Chemicals, Inc., trade name EVOLUE SP2040, polyethylene in accordance with the classification of products, but in fact, copolymer containing a small amount of another α-olefin, melt flow rate: 4.0 g/10 min (190° C.), melting point: 116° C., oxygen permeability coefficient at 25° C.: $3.0 \times 10^{-13}$ [$cm^3 \cdot cm/cm^2/s/Pa$].

Ethylene-propylene copolymer: Made by Mitsui Chemicals, Inc., trade name TAFMER P-0680, mol fraction of ethylene component: about 0.75, melt flow rate: 0.4 g/10 min (190° C.), oxygen permeability coefficient at 25° C.: $1.4 \times 10^{-12}$ [$cm^3 \cdot cm/cm^2/s/Pa$].

Hydrogenated styrene butadiene copolymer: Made by Japan Synthetic Rubber Co., Ltd., trade name: DYNARON 1320P, styrene content: 10%, melt flow rate: 3.5 g/10 min (230° C.).

[Adhesive resin]

Adhesive polyolefin: Made by Mitsui Chemicals, Inc., trade name ADMER NF300, melt flow rate: 1.3 g/10 min (190° C.).

[Barrier resin]

Nylon MXD: Made by Mitsubishi Gas Chemical Co., Inc., trade name MX-NYLON 6007, melt flow rate: 2.0 g/10 min (275° C.), melting point: 240° C., oxygen permeability coefficient at 25° C. (relative humidity of 0%): $2.7 \times 10^{-14}$ [$cm^3 \cdot cm/cm^2/s/Pa$].

[Barrier film]

A laminate obtained by laminating aluminum (7 $\mu$m) and polyethylene terephthalate (25 $\mu$m) made by MA Packaging Co., Ltd., and then further laminating another layer on the aluminum surface.

[Adhesive]

Made by Toyo Morton Ltd., for dry laminate, trade names AD-585 and CAT-10.

[Inorganic filler]

Synthetic silica: Made by Tatsumori Ltd., trade name CRYSTALITE VX-$S_2$, average particle diameter: 5 $\mu$m.

Measurement procedures of various characteristics are as follows.

[Flexural modulus and flexural strength]

The flexural modulus and the flexural strength of each oxygen-absorbing component were measured by cutting an unground crosslinked material to prepare test pieces (e.g., about 4 cm×1 cm×2 mm), and then making a three-point bending test at 25° C. At this time, the flexural modulus E was calculated by the use of a formula $E=FL^3/4WT^3D$ in the case that a relatively small deformation was given, and the flexural strength S was calculated by the use of a formula $S=3FL/2WT^2$ in the case that the deformation was given until the breakage of the test piece. In these formulae, F is a load; L is a span; W is a width of the test piece; T is a thickness of the test piece; and D is a deflection [JIS K7203 (1995)]. In this case, a deformation rate was about 10 cm/sec.

[Linear expansion by swelling]

The linear expansion (a ratio of an increment) of the oxygen-absorbing component by swelling was obtained by cutting an unground crosslinked material to prepare test pieces (length: about 5 cm, thickness: 2 mm or less), immersing each test piece in toluene (which was guaranteed grade and which was used in a volume about 100 times as much as that of the test piece) at 25° C. for one day, and then dividing a variation in length of the test piece before and after the immersion by the length of the test piece before the immersion. Incidentally, all of the undermentioned test pieces reached a swelling equilibrium within 6 hours.

[Density]

The density of the oxygen-absorbing component was measured at 25° C. by the use of a pycnometer and ethanol (guaranteed grade) as a liquid for submerging a crosslinked material.

[Crosslinking degree]

The crosslinking degree of the oxygen-absorbing component was presumed by calculating a density ν of a crosslinking chain (a partial chain put between two crosslinking points) on the basis of a volume change by swelling in accordance with a formula $\nu=-[v+\mu v^2+\log_e(1-v)]/[\rho V_0(v^{1/3}-v/2)]+2/M$ [Junji Furukawa and Shinzo Yamashita, Japanese Rubber Institute Magazine, Vol. 30, p. 955 (1957)] wherein v was a fraction of the volume before the swelling to the volume after the swelling, and $v=1/(1+\alpha)^3$ wherein α was a linear expansion (a ratio of an increment, which was measured as described above); $\mu$ was an interaction parameter between a polymer (here, the crosslinked material) and a solvent [the values of the interaction parameters for the undermentioned object systems were mentioned in, for example, R. G. Beaman, J. Polymer Sci., Vol. 9, p. 470 (1952)]; ρ was a density of the crosslinked material (which was measured as described above); $V_0$ was a molar volume of the solvent (the molar volume of toluene at 25° C. was 107 $cm^3$/mol); and M was a molecular weight of the material to be crosslinked before the crosslinking. On the basis of ν obtained in the above manner, the number of the crosslinking points was ½ by the calculation.

[Number of carbon-carbon double bonds in crosslinked material]

Since a part of carbon-carbon double bonds was consumed by a crosslinking reaction (All crosslinking reaction are not derived from the carbon-carbon double bonds), the number thereof was calculated on the assumption that the number of the carbon-carbon double bonds in the crosslinked material was equal to a value obtained by subtracting the number of crosslinking points from the number of the double bonds before the crosslinking.

[Heat resistance]

The heat resistance of the oxygen-absorbing component was evaluated as follows. The powder or the particle of the oxygen-absorbing component was first put on a metal plate heated up to a predetermined temperature for about 30 seconds (if it was put for a long time, deformation or color change by oxidation occurred), and fluidity, deformation and mutually adhesion were then observed.

[Measurement of oxygen-absorbing performance of the oxygen-absorbing component]

The measurement of the oxygen-absorbing performance of the oxygen-absorbing component was carried out by putting 1 g of the sieved oxygen-absorbing component having a diameter of 300 $\mu$m or less and 1000 $cm^3$ of air in a transparent oxygen barrier bag including a nylon layer coated with polyvinylidene chloride, and then following the change in an oxygen concentration at 25° C. with the lapse of time by gas chromatography.

[Measurement of the oxygen-absorbing performance of an oxygen absorbent package, and an oxygen-absorbing monolayered body and multilayered body]

The measurement of the oxygen-absorbing performance of an oxygen absorbent package, and an oxygen-absorbing monolayered body and multilayered body was carried out by putting each test piece thereof and a predetermined amount of air in the above-mentioned oxygen barrier bag, and then following the change in an oxygen concentration at 25° C. with the lapse of time by gas chromatography. At this time, in the case of the multilayered body including a porous oxygen-absorbing layer or the multilayered body including a porous oxygen-absorbing layer and a porous layer, the edge surfaces of the multilayered body were covered with a synthetic rubber adhesive so as not to absorb oxygen through these edge surfaces.

Thus, a time taken until the oxygen concentration reached 0.1% by volume was regarded as a oxygen-absorbing time. Here, since the change in the oxygen concentration with the lapse time simply decreased, the oxygen-absorbing performance could sufficiently be represented by this oxygen-absorbing time.

[Odor]

The odor was sensuously evaluated by smelling at the gas in the bag.

EXAMPLE 1

90 parts by weight of butadiene oligomer (Polyoil 110), 10 parts by weight of Perbutyl P and 0.1 part by weight of cobalt stearate were mixed at about 60° C., and the mixture was then heated at 180° C. for 10 minutes in a container which had been purged with nitrogen, thereby obtaining a crosslinked polymer. This polymer was cooled to room temperature and then taken out, and a part of the polymer was used as samples for measurements, and the remainder of the polymer was ground into a powder by a rotary blade type grinder as well as a mortar and a pestle. At this time, the crosslinked polymer was brittle, and so the grinding operation was extremely easy.

By the various measurements, the flexural modulus, the flexural strength and the specific gravity of the crosslinked polymer were 2.7 MPa, 1.0 MPa and 0.96 g/cm$^3$, respectively, and the linear expansion of the crosslinked polymer by swelling during toluene immersion was 30%. On the basis of $\mu$=0.37, $\nu$ was 0.0026 mol/g, and the number of crosslinking points was 0.0013 mol/g by calculation. Furthermore, the number of the carbon-carbon double bonds of the crosslinked polymer was 0.0185×(90/100.1)−0.0013=0.0153 mol/g by calculation. In addition, heat resistance was 150° C. or higher.

Figure 17:
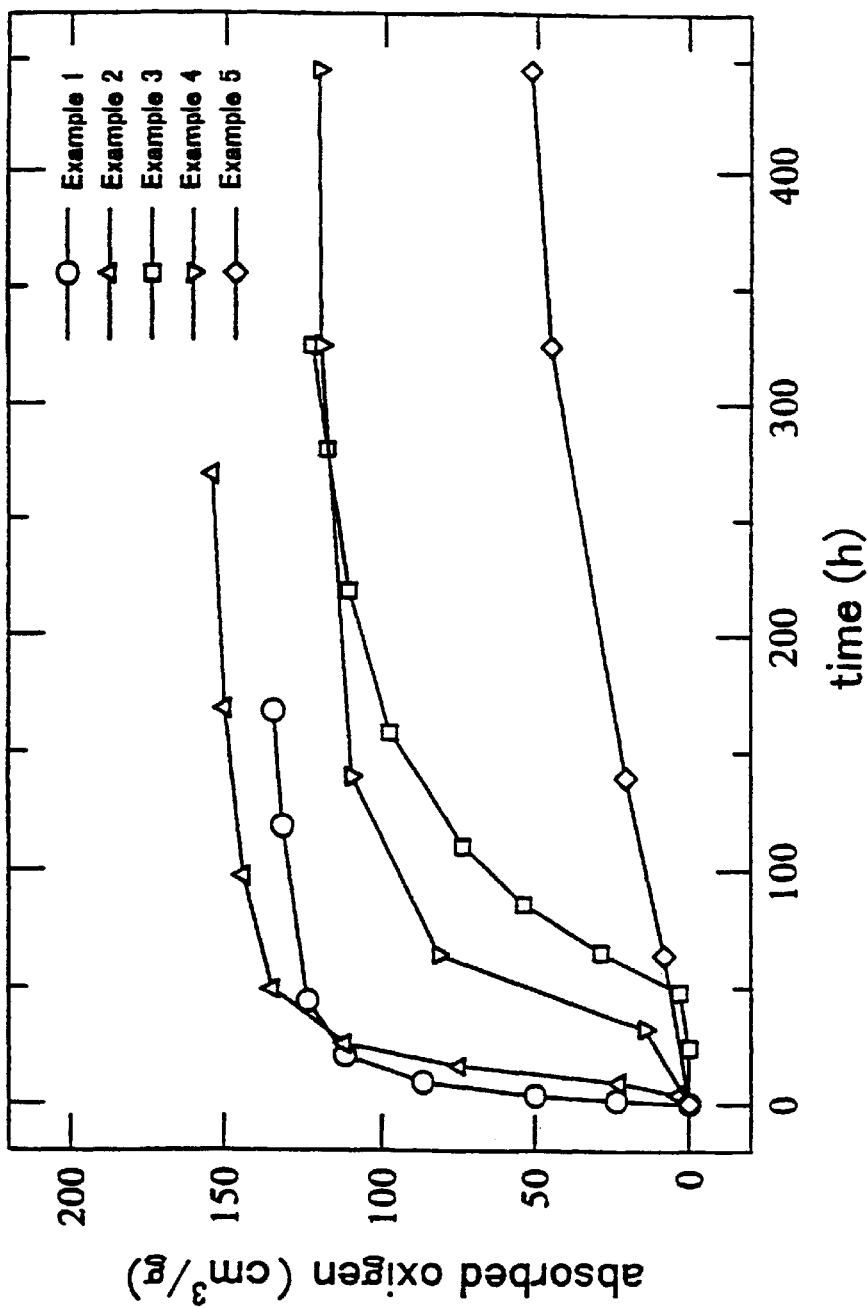
FIG. 17 shows changes with the lapse of time in amounts of oxygen absorbed by the oxygen-absorbing components in Examples 1 to 5.

Oxygen-absorbing states are shown in FIG. 17. When 0.5 g of active carbon was added to 1 g of an oxygen-absorbing component to absorb oxygen, a bad odor was scarcely felt.

EXAMPLE 2

The same procedure as in Example 1 was conducted except that cobalt stearate was replaced with 0.1 part by weight of tall oil fatty acid manganese salt, thereby obtaining a powdery crosslinked polymer. The state of oxygen absorption is shown in FIG. 17.

EXAMPLE 3

The same procedure as in Example 1 was conducted except that cobalt stearate was not used, thereby obtaining a powdery crosslinked polymer including no catalyst. The state of oxygen absorption is shown in FIG. 17. In this example, an induction period in which the oxygen absorption is slow is longer than that in Example 1 or Example 2, and it can be understood that the induction period can be adjusted by a fraction of the added catalyst in consideration of a combination of this example and Example 1, and another combination of this example and Example 2.

EXAMPLE 4

87 parts by weight of polyisoprene (IR 2200), 11 parts by weight of Perbutyl P and 2 parts by weight of tall oil fatty acid manganese salt were mixed at about 90° C., and the mixture was then heated at 170° C. for 5 minutes while sandwiched between two sheets of polyethylene terephthalate (for the prevention of the adhesion of the mixture to metallic plates of a heating press) between the two metallic plates of the heating press, thereby obtaining a crosslinked polymer. This polymer was taken out together with these sheets and cooled to room temperature, and the sheets were then removed. A part of the polymer was used as samples for measurements, and the remainder of the polymer was ground into a powder by a rotary blade type grinder as well as a mortar and a pestle. At this time, the crosslinked polymer had more or less flexibility, but the grinding operation was possible.

By the various measurements, the flexural, the flexural strength and the specific gravity of the crosslinked polymer were 4.6 MPa, 0.8 MPa and 0.97 g/cm$^3$, respectively, and the linear expansion of the crosslinked polymer by swelling during toluene immersion was 24%. On the basis of $\mu$=0.39, $\nu$ was 0.0020 mol/g, and the number of crosslinking points was 0.0010 mol/g by calculation. Furthermore, the number of the carbon-carbon double bonds of the crosslinked polymer was 0.0147×(87/100)−0.0010=0.0118 mol/g by calculation. In addition, heat resistance was 150° C. or higher.

Oxygen-absorbing states are shown in FIG. 17. When 0.5 g of active carbon was added to 1 g of an oxygen-absorbing component to absorb oxygen, a bad odor was scarcely felt.

EXAMPLE 5

93 parts by weight of styrene butadiene copolymer (E-SBR 1500), 5 parts by weight of Perbutyl P and 2 parts by weight of tall oil fatty acid manganese salt were mixed at about 90° C., and the mixture was then heated at 170° C. for 5 minutes in the same manner as in Example 4 to obtain a crosslinked polymer. A part of this polymer was used as samples for measurements, and the remainder of the polymer was ground into a powder. At this time, the crosslinked polymer had more or less flexibility, but the grinding operation was possible.

By the various measurements, the flexural modulus, the flexural strength and the specific gravity of the crosslinked polymer were 21 MPa, 2.4 MPa and 0.98 g/cm$^3$, respectively, and the linear expansion of the crosslinked polymer by swelling during toluene immersion was 20%. On the basis of $\mu$=0.31, it could be presumed that $\nu$ was 0.0032 mol/g, and the number of crosslinking points was 0.0016 mol/g. Furthermore, the number of the carbon-carbon double bonds of the crosslinked polymer was 0.0142×(93/100)−0.0016=0.0116 mol/g by calculation. In addition, heat resistance was 150° C. or higher.

Oxygen-absorbing states are shown in FIG. 17. When 0.5 g of active carbon was added to 1 g of an oxygen-absorbing component to absorb oxygen, a bad odor was scarcely felt.

COMPARATIVE EXAMPLE 1

0.1 part by weight of cobalt stearate was dissolved in 100 parts by weight of butadiene oligomer (Polyoil 110) at about 60° C. The resultant solution was a viscous liquid, and hence it was difficult to directly use it as a stable oxygen-absorbing component without any additional treatment.

COMPARATIVE EXAMPLE 2

100 parts by weight of polyisoprene (IR 2200) and 0.1 part by weight of tall oil fatty acid manganese salt were mixed at 90° C., and after the mixture was then cooled to room temperature, grinding was tried. This mixture was rubbery and soft, and it was difficult to grind it at room temperature. Furthermore, the mixture was cooled with liquid nitrogen and then ground, and in this case, the grinding operation was possible, but when the temperature of the mixture was returned to room temperature, the particles adhered to each other, and for this reason, it was impossible to directly use the mixture as a stable oxygen-absorbing component without any additional treatment.

EXAMPLE 6

93 parts by weight of butadiene oligomer (Polyoil 130), 7 parts by weight of Perbutyl P, 1 part of iron stearate (III) and 1 part by weight of glycerol monostearate were mixed at about 60° C., and the mixture was then heated at 180° C. for 30 minutes in a container previously purged with nitrogen, thereby obtaining a crosslinked polymer. This polymer was cooled to room temperature and then taken out, and a part of the polymer was used as samples for measurements, and the remainder of the polymer was ground into a powder having a maximum particle diameter of 300 µm and an average particle diameter of 180 µm by a rotary blade type grinder. At this time, the crosslinked polymer was brittle, and so the grinding operation was extremely easy.

By the various measurements, the flexural modulus, the flexural strength and the specific gravity of the crosslinked polymer were 2.8 MPa, 1.0 MPa and 0.95 g/cm$^3$, respectively, and the linear expansion of the crosslinked polymer by swelling during toluene immersion was 32%. On the basis of $\mu$=0.37, v was 0.0019 mol/g, and the number of crosslinking points was 0.0010 mol/g by calculation. Furthermore, the number of the carbon-carbon double bonds of the crosslinked polymer was 0.0185×(93/102)−0.0010= 0.0159 mol/g by calculation. In addition, heat resistance was 150° C. or higher.

Next, 1 g of this powdery crosslinked polymer and 0.1 g of active carbon were placed in a bag made of a packaging material comprising a laminate of a perforated polyethylene film and a paper, and this packaging material was then heat-sealed along the periphery to obtain an integrated sachet type oxygen-absorbing component package. The area of the packaging material except the heat-sealed portion was 40 cm$^2$.

This oxygen absorbent package and 300 cm$^3$ of air were put in an oxygen barrier bag, and it was then allowed to stand at 25° C. An oxygen-absorbing time was 2.9 days. In addition, a bad odor was scarcely felt.

EXAMPLE 7

35% by weight of the same powdery crosslinked polymer as in Example 6, 2% by weight of active carbon and 63% by weight of polypropylene (FG3D) were mixed under heating at 200° C., and the mixture was then molded, followed by cooling the thus molded article to form a sheet having a thickness of 2 mm. This sheet was heated up to 120° C., and then drawn in a uniaxial direction about 6 times to obtain a continuously porous sheet. The porosity of the sheet which had been drawn to make it porous was calculated on the basis of a dimensional change before and after the drawing, and it was 0.45.

This drawn sheet (the oxygen-absorbing monolayered body) was cut into 5 pieces having an area of 10 cm$^2$ (about 3 g in total), and all of the 5 pieces were then placed in a bag made of the same packaging material as in Example 6 to prepare an integrated sachet type oxygen absorbent package.

By the same measurement as in Example 6, an oxygen-absorbing time was 3.1 days. In addition, a bad odor was scarcely felt.

EXAMPLE 8

A packaging material comprising a laminate of a perforated polyethylene film and a paper, and another packaging material of a polyethylene film having one adhesive surface were joined with the interposition of the same two pieces as in Example 7 so that both the polyethylene sides might face to each other, and the thus joined packaging materials were then heat-sealed along their peripheries, thereby preparing an integrated label type oxygen absorbent package.

An oxygen-absorbing time was measured in the same manner as in Example 6 except that the amount of air was 100 cm$^3$, and as a result, it was 3.0 days. In addition, a bad odor was scarcely felt.

EXAMPLE 9

A packaging material comprising a laminate of a perforated polyethylene film and a paper, and another packaging material obtained by laminating a polyethylene film on a paper having a thickness of about 1 mm were joined with the interposition of the same two pieces as in Example 7 so that both the polyethylene sides might face to each other, and the thus joined packaging materials were then heat-sealed along their peripheries, thereby preparing an integrated card type oxygen absorbent package.

An oxygen-absorbing time was measured in the same manner as in Example 8, and as a result, it was 3.0 days. In addition, a bad odor was scarcely felt.

EXAMPLE 10

A packaging material comprising a laminate of a perforated polyethylene film and a paper, and a foamed polyethylene sheet having a thickness of about 0.5 mm were joined with the interposition of the same two pieces as in Example 7 so that both the polyethylene side of the former might face to the latter, and the thus joined packaging materials were then heat-sealed along their peripheries, thereby preparing an integrated packing type oxygen absorbent package.

An oxygen-absorbing time was measured in the same manner as in Example 8, and as a result, it was 3.0 days. In addition, a bad odor was scarcely felt.

COMPARATIVE EXAMPLE 3

The same procedure as in Example 6 was conducted except that a crosslinked polymer was replaced with an oxygen-absorbing component obtained by spraying an aqueous solution of calcium chloride onto an iron powder having an average particle diameter of about 50 µm (an amount of calcium chloride: 2 parts by weight based on 100 parts by weight of the iron powder) and then drying it, thereby preparing an oxygen absorbent package, and an oxygen-absorbing time was then measured.

This oxygen-absorbing component did not function in the dry state, thereby failing to absorb oxygen even after 15 days.

EXAMPLE 11

The same powdery crosslinked polymer as in Example 6 was sieved to select the polymer particles having a particle diameter of less than 50 µm. A mixture for an oxygen-absorbing layer of 40% by weight of this crosslinked polymer having a particle diameter of 50 µm, 2% by weight of active carbon and 58% by weight of polyethylene and another mixture for a non-porous layer of 50% by weight of polyethylene and 50% by weight of ethylene-propylene copolymer were co-extruded to form a semitransparent oxygen-absorbing multilayered body having the respective layers and thicknesses of the non-porous layer (50 µm)/the oxygen-absorbing layer (300 µm)/the non-porous layer (50 µm).

Next, 1000 cm² of this oxygen-absorbing multilayered body was placed in an oxygen barrier bag together with 100 cm² of air, and it was then allowed to stand at 25° C. An oxygen-absorbing time was 15 days. In addition, a bad odor was scarcely felt.

EXAMPLE 12

A mixture for an oxygen-absorbing layer (which became a porous oxygen-absorbing layer after drawing) of 35% by weight of the same crosslinked polymer having a particle diameter of 50 μm as in Example 11, 2% by weight of active carbon and 63% by weight of polyethylene, a mixture for a non-porous layer of 50% by weight of polypropylene and 50% by weight of hydrogenated styrene butadiene copolymer, and a mixture for a filler-containing layer (which became a porous layer after the drawing) of 50% by weight of polypropylene and 50% by weight of synthetic silica were co-extruded to form a five-layer product having the respective layers and thicknesses of the non-porous layer (50 μm)/the filler-containing layer (150 μm)/the oxygen-absorbing layer (300 μm)/the filler-containing layer (150 μm)/the non-porous layer (50 μm). Furthermore, this five-layer product was heated up to 120° C., and then drawn in a uniaxial direction about 6 times to form the porous oxygen-absorbing layer and the porous layer and to make the non-porous layer thin, thereby obtaining an oxygen-absorbing multilayered body having the respective layers and thicknesses of the non-porous layer (about 10 μm)/the porous layer (about 50 μm)/the porous oxygen-absorbing layer (about 100 μm)/the porous layer (about 50 μm)/the non-porous layer (about 10 μm).

Next, 1000 cm² of this oxygen-absorbing multilayered body was placed in an oxygen barrier bag together with 500 cm² of air, and it was then allowed to stand at 25° C. An oxygen-absorbing time was 2.5 days. In addition, a bad odor was scarcely felt.

EXAMPLE 13

There were used a mixture for an oxygen-absorbing layer of 40% by weight of the same crosslinked polymer having a particle diameter of 50 μm as in Example 11, 2% by weight of active carbon and 58% by weight of polyethylene, a mixture for a non-porous layer of 50% by weight of polyethylene and 50% by weight of ethylene propylene copolymer, adhesive polyolefin for an adhesive layer and nylon MXD for a barrier layer, thereby preparing an oxygen-absorbing multilayered body having the respective layers and thicknesses of the non-porous layer (50 μm)/the oxygen-absorbing layer (300 μm)/the adhesive layer (10 μm)/the barrier layer (50 μm).

Next, 1000 cm² of this oxygen-absorbing multilayered body was placed in an oxygen barrier bag together with 100 cm² of air, and it was then allowed to stand at 25° C. An oxygen-absorbing time was 18 days. In addition, a bad odor was scarcely felt.

EXAMPLE 14

The same components for an oxygen-absorbing layer (which became a porous oxygen-absorbing layer after drawing), a non-porous layer and a filler-containing layer (which became a porous layer after the drawing) as in Example 12 as well as polypropylene for a buffer layer were co-extruded to form a four-layer product having the respective layers and thicknesses of the non-porous layer (50 μm)/the filler-containing layer (150 μm)/the oxygen-absorbing layer (300 μm)/the buffer layer (40 μm). Furthermore, this four-layer product was heated up to 120° C., and then drawn in a uniaxial direction about 6 times to form the porous oxygen-absorbing layer and the porous layer and to make the non-porous layer and the buffer layer thin, thereby obtaining a four-layer product having the respective layers and thicknesses of the non-porous layer (about 10 μm)/the porous layer (about 50 μm)/the porous oxygen-absorbing layer (about 100 μm)/the buffer layer (about 8 μm). Furthermore, the surface of this four-layer product was subjected to a corona discharge treatment at 3.6 kJ/m², and a barrier film as a barrier layer was laminated thereon via an adhesive to form an oxygen-absorbing multilayered body having the constitution of the non-porous layer/the porous layer/the porous oxygen-absorbing layer/ the buffer layer/the adhesive layer/the barrier layer.

Next, 1000 cm² of this oxygen-absorbing multilayered body was placed in an oxygen barrier bag together with 500 cm² of air, and it was then allowed to stand at 25° C. An oxygen-absorbing time was 6.1 days. In addition, a bad odor was scarcely felt.

COMPARATIVE EXAMPLE 4

The same procedure as in Example 7 was conducted except that the same oxygen-absorbing component as in Comparative Example 3 was used in an addition ratio of 70% by weight in place of a crosslinked polymer and 28% by weight of polypropylene (FG30) was used, thereby preparing an oxygen-absorbing monolayered body, and an oxygen-absorbing time was then measured. This oxygen-absorbing component did not function in the dry state, thereby failing to absorb oxygen even after 15 days.

COMPARATIVE EXAMPLE 5

The unground lump of the same crosslinked polymer as in Example 6 was cut into small pieces having a thickness of about 300 μm and an area of about 5 cm³, and the piece was then allowed to stand in air. With the progress of oxidation, this piece became brittle.

In this example, the piece had a crosslinked structure, so that the deterioration of the piece could be restrained to some extent, but usually, in a resin which contain a metallic catalyst and in which the oxidation is thus liable to occur, strength deterioration cannot be suppressed.

An oxygen-absorbing component of the present invention can be used in a wide humidity range of a dry state to a highly humid state, has a high oxygen absorption rate, can easily be handled, and also has a high safety against eating by mistake. An oxygen absorbent package or an oxygen-absorbing monolayered body and multilayered body containing this oxygen-absorbing component can be used for the purpose of preventing the oxidation of various products such as foods, drugs, metallic products and electronic products which are liable to be affected by oxygen to bring about a quality change.

What is claimed is:
1. An oxygen-absorbing composition which comprises
  (a) a powdery or particulate crosslinked polymer comprising crosswise connecting points that connect parallel chains of the polymer, said crosslinked polymer having (i) an average particle diameter of 0.01 to 5 mm, (ii) 0.001 to 0.025 mol of carbon-carbon unsaturated bonds per gram, and (iii) 0.0001 to 0.02 mol of said crosswise connecting points per gram, said crosslinked polymer being a polymer formed by partially crosslinking a polymer of a diene or a copolymer of a diene and another unsaturated compound and

(b) a catalyst for an oxidation reaction, said catalyst including at least one of a metal and a metallic compound.

2. The oxygen-absorbing composition according to claim 1 wherein said crosslinked polymer contains an antistatic compound.

3. The oxygen-absorbing composition according to claim 1 wherein said crosslinked polymer has a flexural modulus of 0.1 MPa or more at 25° C.

4. The oxygen-absorbing composition according to claim 1 wherein said crosslinked polymer has a flexural strength of 100 MPa or less at 25° C.

5. The oxygen-absorbing composition according to claim 1 wherein said crosslinked polymer has a linear expansion of 50% or less after it has been immersed and swelled in toluene at 25° C. for one day.

6. An oxygen absorbent package wherein the oxygen-absorbing composition described in claim 1 and at least one optional component selected from the group consisting of an adsorbing component, a heat absorbing component, a drying component and an antibacterial component are covered with a partially or wholly gas permeable packaging material.

7. The oxygen absorbent package according to claim 6 wherein the permeability of the packaging material is $5 \times 10^{-5}$ ($cm^3/cm^2/h/Pa$) or more expressed in terms of gas permeability.

8. A label oxygen absorbent package in which an adhesive portion is formed at a part on the outside of a packaging material of the oxygen absorbent package described in claim 6.

9. A card oxygen absorbent package in which a rigid base material is used at a part of a packaging material of the oxygen absorbent package described in claim 6.

10. A packing oxygen-absorbing multilayered body in which a flexible base material is used at a part of a packaging material of the oxygen absorbent package described in claim 6.

11. An oxygen-absorbing resin composition wherein the oxygen-absorbing composition described in claim 1 and at least one optional component selected from the group consisting of an adsorbing component, a heat absorbing component, a drying component and an antibacterial component are dispersed in a thermoplastic resin.

12. An oxygen-absorbing monolayered body wherein the oxygen-absorbing resin composition described in claim 11 is molded into a sheet or a film.

13. An oxygen absorbent package in which a piece of the oxygen-absorbing monolayered body described in claim 12 is covered with a partially or wholly gas permeable packaging material.

14. The oxygen absorbent package according to claim 13 wherein the permeability of the packaging material is $5 \times 10^{-5}$ ($cm^3/cm^2/h/Pa$) or more expressed in terms of gas permeability.

15. A label oxygen absorbent package in which an adhesive portion is formed at a part on the outside of a packaging material of the oxygen absorbent package described in claim 13.

16. A card oxygen absorbent package in which a rigid base material is used at a part of a packaging material of the oxygen absorbent package described in claim 13.

17. A packaging oxygen-absorbing multilayered body in which a flexible base material is used at a part of a packaging material of the oxygen absorbent package described in claim 13.

18. A continuously porous sheet or film oxygen-absorbing monolayered body which is formed by molding the oxygen-absorbing resin composition described in claim 11 into a sheet or a film, and then drawing it.

19. An oxygen absorbent package in which a piece of the oxygen-absorbing monolayered body described in claim 18 is covered with a partially or wholly gas permeable packaging material.

20. The oxygen absorbent package according to claim 19 wherein the permeability of the packaging material is $5 \times 10^{-5}$ ($cm^3/cm^2/h/Pa$) or more expressed in terms of gas permeability.

21. A label oxygen absorbent package in which an adhesive portion is formed at a part on the outside of a packaging material of the oxygen absorbent package described in claim 19.

22. A card oxygen absorbent package in which a rigid base material is used at a part of a packaging material of the oxygen absorbent package described in claim 19.

23. A packaging oxygen-absorbing multilayered body in which a flexible base material is used at a part of a packaging material of the oxygen absorbent package described in claim 19.

24. An oxygen-absorbing multilayered body in which an oxygen-permeating layer comprising a resin having a high oxygen permeability is laminated on one-side of an oxygen-absorbing layer comprising the oxygen-absorbing resin composition described in claim 11, and a barrier layer comprising a material having a low oxygen permeability is laminated on the other side of the oxygen-absorbing layer.

25. The oxygen-absorbing multilayered body according to claim 24 wherein the oxygen-permeating layer comprises a non-porous oxygen-permeating layer and a continuously porous oxygen-permeating layer.

26. The oxygen-absorbing multilayered body according to claim 24 wherein the oxygen-absorbing layer is a continuously porous layer.

27. A method for preparing the oxygen-absorbing multilayered body described in claim 26 which comprises drawing a layer comprising a thermoplastic resin containing 10 to 60% by weight of a crosslinked polymer at least uniaxially at a draw ratio of 2 to 20 in terms of sectional area to form a continuously porous oxygen-absorbing layer.

28. A method for preparing the oxygen-absorbing multilayered body described in claim 26 which comprises a step of forming the continuously porous oxygen-absorbing layer by drawing a composite comprising a resin layer comprising a thermoplastic resin containing 10 to 60% by weight of a crosslinked polymer on which a buffer layer consisting essentially of a resin is laminated, at least uniaxially at a draw ratio of 2 to 20 in terms of sectional area to form a continuously porous oxygen-permeating layer; and a step of adhering or fusing a gas-barrier layer on said buffer layer.

29. The oxygen-absorbing multilayered body according to claims 24 wherein the oxygen permeability of the non-porous oxygen-permeating layer is in the range of $1 \times 10^{-11}$ to $6 \times 10^{-9}$ ($cm^3/cm^2/s/Pa$).

30. The oxygen-absorbing multilayered body according to claim 24 wherein the oxygen permeability of the barrier layer is $1 \times 10^{-12}$ ($cm^3/cm^2/s/Pa$) or less.

31. An oxygen-absorbing multilayered body in which either or both of a non-porous oxygen-permeating layer and a continuously porous oxygen-permeating layer are laminated on both the sides of an oxygen-absorbing layer comprising the oxygen-absorbing resin composition described in claim 11, respectively.

32. The oxygen-absorbing multilayered body according to claim 31 wherein the oxygen-absorbing layer is a continuously porous layer.

33. The oxygen-absorbing multilayered body according to claim 31 wherein the oxygen permeability of the non-porous oxygen-permeating layer is in the range of $1\times10^{-11}$ to $6\times10^{-9}$ ($cm^3/cm^2/s/Pa$).

34. The oxygen-absorbing composition according to claim 1, wherein the crosslinked polymer has an average particle diameter of 0.03 to 0.5 mm, a flexural modulus at 25° C. of 10 MPa or more, a bending strength of 10 MPa or more, and a linear expansion of 50% or less after the crosslinked polymer has been immersed in toluene at 25° C. for one day.

35. The oxygen-absorbing composition according to claim 34, wherein the catalyst is selected from the group consisting of cobalt, iron and manganese.

* * * * *